(12) United States Patent
Jackson et al.

(10) Patent No.: US 11,597,544 B2
(45) Date of Patent: Mar. 7, 2023

(54) TURNTABLE SYSTEM

(71) Applicant: Rehrig Pacific Company, Los Angeles, CA (US)

(72) Inventors: Peter Douglas Jackson, Alpharetta, GA (US); Robert Lee Martin, Jr., Lucas, TX (US); Jason Crawford Miller, Bedford, TX (US); Hisham Khalid A. Alshmmasi, Frisco, TX (US); Derick Foster, Cumming, GA (US); Daniel James Thyer, Charlotte, NC (US); Dane Gin Mun Kalinowski, Foothill Ranch, CA (US); Joseph E. Popovits, II, Costa Mesa, CA (US); Justin Corless, Flower Mound, TX (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 17/573,101

(22) Filed: Jan. 11, 2022

(65) Prior Publication Data
US 2022/0219846 A1    Jul. 14, 2022

Related U.S. Application Data

(60) Provisional application No. 63/136,191, filed on Jan. 11, 2021, provisional application No. 63/165,553, filed on Mar. 24, 2021.

(51) Int. Cl.
*B65B 11/04* (2006.01)
*B65B 57/10* (2006.01)
(Continued)

(52) U.S. Cl.
CPC ............ *B65B 11/045* (2013.01); *B65B 57/10* (2013.01); *G06V 10/70* (2022.01); *H04N 23/90* (2023.01);
(Continued)

(58) Field of Classification Search
USPC .......................................................... 53/556
See application file for complete search history.

(56) References Cited

U.S. PATENT DOCUMENTS

| | | | |
|---|---|---|---|
| 4,005,777 A * | 2/1977 | Marantz ................ | B65B 11/585 206/497 |
| 4,955,181 A * | 9/1990 | Casteel ................. | B65B 11/045 53/556 |

(Continued)

FOREIGN PATENT DOCUMENTS

| | | |
|---|---|---|
| EP | 0086045 A2 | 8/1983 |
| EP | 0205909 A1 | 12/1986 |

(Continued)

OTHER PUBLICATIONS

Partial European Search Report for European Application No. 22175951.7 dated Nov. 18, 2022.

*Primary Examiner* — Chinyere J Rushing-Tucker
(74) *Attorney, Agent, or Firm* — Carlson, Gaskey & Olds, P.C.

(57) ABSTRACT

Several embodiments of turntable systems for loaded pallets are disclosed. In some embodiments, a first ramp leads up to the turntable and a second ramp leads down from the turntable on the opposite side. In other embodiments, at least two turntables are positioned adjacent one another, optionally with a bridge surface connecting them so that a pallet lift can be driven from one turntable to the other to place one pallet on one turntable and another pallet on the other turntable according to a method disclosed herein. A validation system without a turntable includes a plurality of cameras about a periphery of a platform weight sensor.

21 Claims, 32 Drawing Sheets

(51) Int. Cl.
  G06V 10/70 (2022.01)
  H04N 23/90 (2023.01)
  B65G 69/26 (2006.01)
(52) U.S. Cl.
  CPC ...... *B65G 69/26* (2013.01); *B65G 2201/0267* (2013.01); *B65G 2203/0258* (2013.01)

(56) References Cited

U.S. PATENT DOCUMENTS

| | | |
|---|---|---|
| 7,178,317 B1 | 2/2007 | Koskela |
| 8,001,745 B2 | 8/2011 | Carter et al. |
| 8,166,732 B2 | 5/2012 | Cousins et al. |
| 8,403,614 B2 | 3/2013 | Bastian, II et al. |
| 8,474,224 B2 | 7/2013 | Rossi |
| 9,017,007 B2 | 4/2015 | Therkildsen |
| 10,934,034 B2 | 3/2021 | Lancaster, III et al. |
| 11,034,470 B2 | 6/2021 | Lancaster, III et al. |
| 2006/0131405 A1* | 6/2006 | Schneider ............... G01S 13/75 340/8.1 |
| 2009/0293425 A1* | 12/2009 | Carter .................. B65B 11/025 53/167 |
| 2010/0064906 A1 | 3/2010 | Rossi |
| 2010/0239403 A1* | 9/2010 | Lancaster, III ........ B65G 65/00 414/595 |
| 2012/0175170 A1* | 7/2012 | Martin .................... G01G 19/52 177/201 |
| 2013/0300047 A1* | 11/2013 | Hendren ............... B65B 11/045 269/57 |
| 2015/0101281 A1* | 4/2015 | Kudia ..................... B65B 57/18 53/51 |
| 2017/0101205 A1 | 4/2017 | Schieck et al. |
| 2018/0273226 A1* | 9/2018 | Lancaster, III ......... B65B 57/14 |
| 2020/0273131 A1 | 8/2020 | Martin, Jr. et al. |

FOREIGN PATENT DOCUMENTS

| | | | |
|---|---|---|---|
| EP | 0246659 A1 | 11/1987 | |
| EP | 1083126 A1 | 3/2001 | |
| GB | 2338695 A | 12/1999 | |
| WO | 2008132566 A1 | 11/2008 | |
| WO | WO-2008132566 A1 * | 11/2008 | ........... B65B 11/045 |
| WO | 2009087600 A2 | 7/2009 | |

* cited by examiner

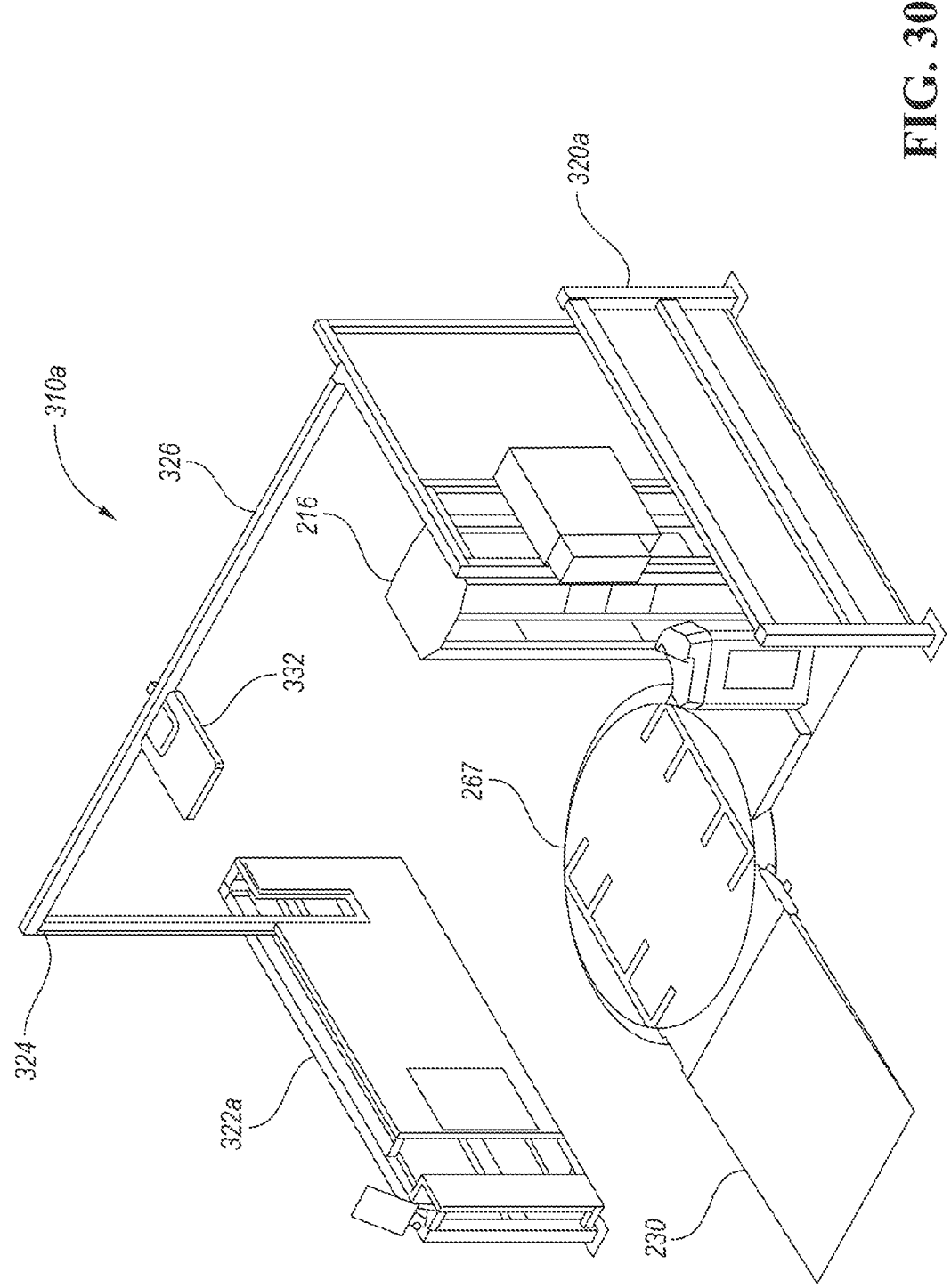

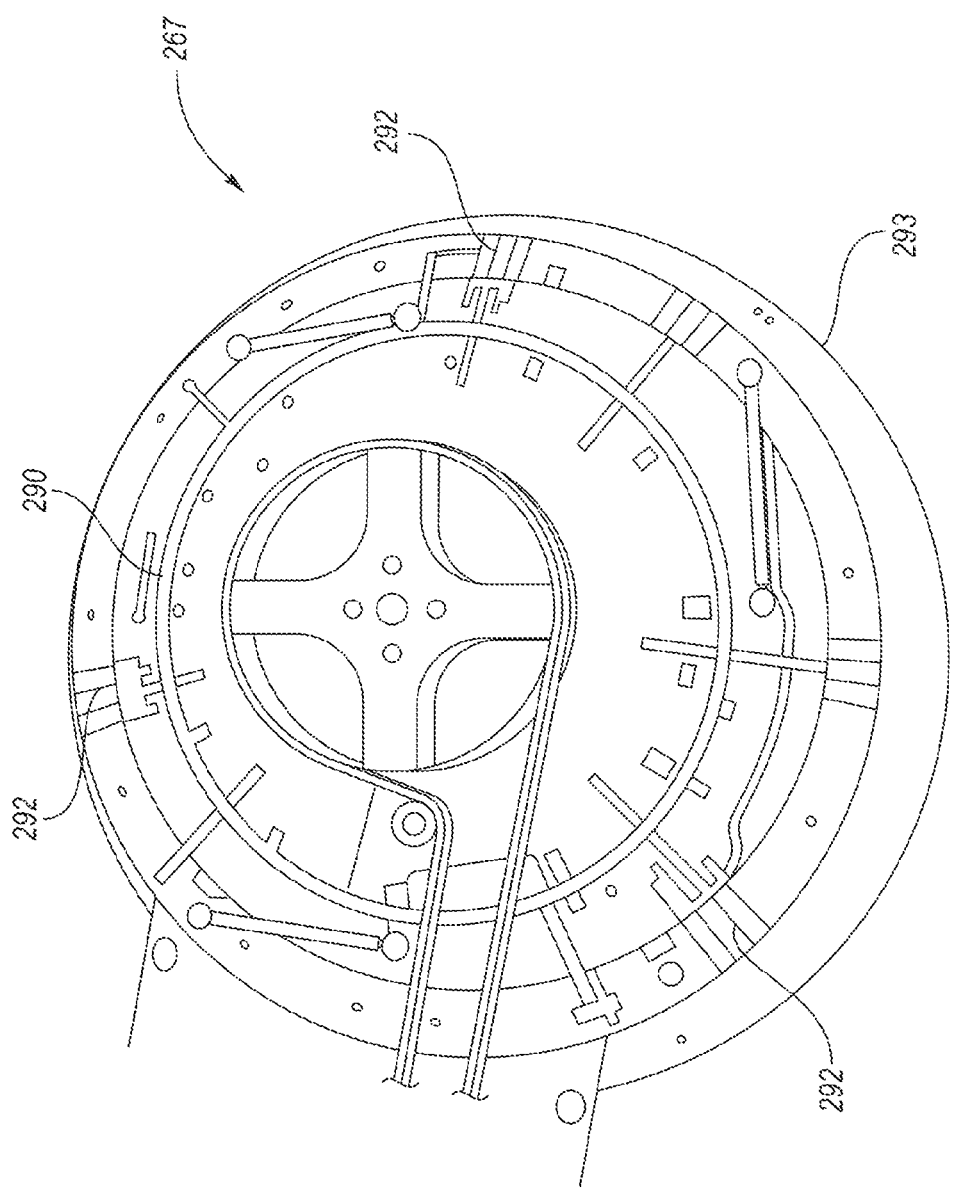

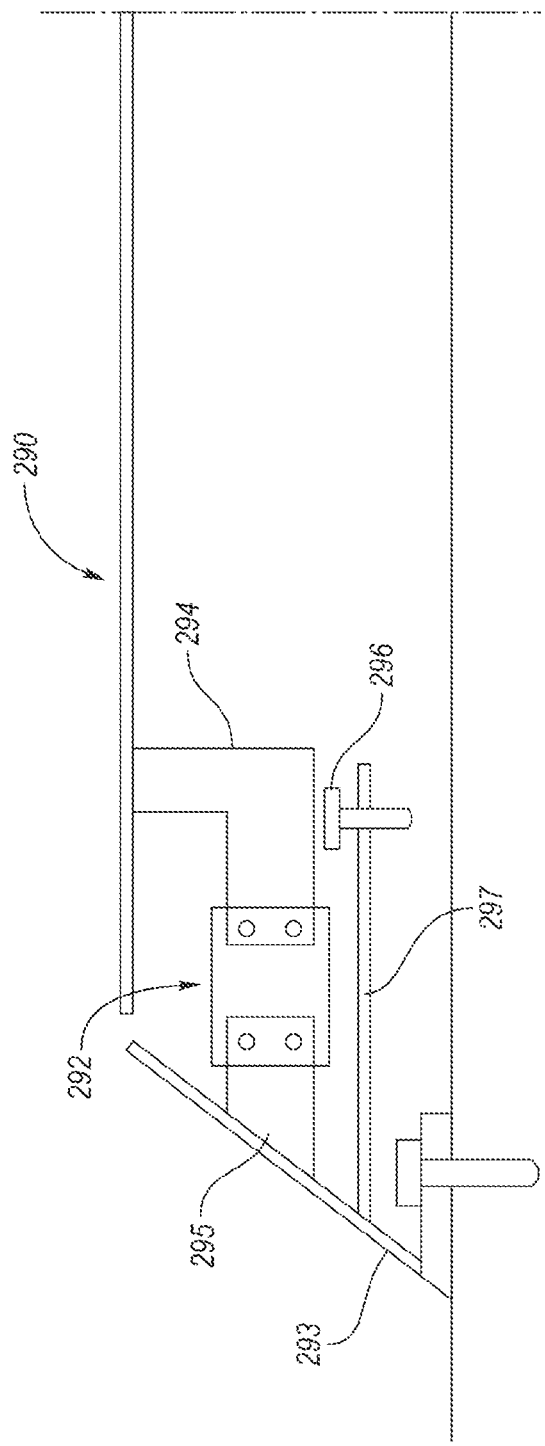

TURNTABLE SYSTEM

BACKGROUND

The delivery of products to stores from distribution centers has many steps that are subject to errors and inefficiencies.

For example, the products may be cases of beverage containers (e.g. cartons of cans and beverage crates containing bottles or cans, etc). There are many different permutations of flavors, sizes, and types of beverage containers delivered to each store. When building pallets, missing or mis-picked product can account for significant additional operating costs.

In some implementations, stretch wrap is wrapped around a loaded pallet to keep the items stacked stably thereon. The loaded pallet may be placed on a turntable and rotated while the stretch wrap is wrapped around the items on the pallet. This takes some time and occupies valuable space in the warehouse.

SUMMARY

The present application provides several embodiments of turntable systems that can be used for validation of loaded pallets, wrapping loaded pallets with stretch wrap, or both. In some embodiments, a first ramp leads up to the turntable and a second ramp leads down from the turntable on the opposite side. In other embodiments, at least two turntables are positioned adjacent one another, optionally with a bridge surface connecting them so that a pallet lift can be driven from one turntable to the other to place one pallet on one turntable and another pallet on the other turntable according to a method disclosed herein. A validation system without a turntable includes a plurality of cameras about a periphery of a platform weight sensor.

In some embodiments, a turntable system includes a first turntable capable of supporting a loaded pallet and a second turntable capable of supporting a loaded pallet. The second turntable is adjacent the first turntable. A support surface is between the first turntable and the second turntable. The support surface is substantially flush with an upper surface of the first turntable and an upper surface of the second turntable.

A first camera may be directed toward the first turntable and a second camera may be directed to the second turntable. A stretch wrapper dispenser may be mounted adjacent the first turntable. A ramp may be positioned to lead up to the first turntable.

The system may further include an overhead gantry. The overhead gantry may extend between the first turntable and the second turntable. At least one light may be mounted to the overhead gantry. A first stretch wrapper dispenser may be positioned adjacent the first turntable and a first camera may be directed toward the first turntable, such that the first turntable is between the first stretch wrapper dispenser and the first camera.

The overhead gantry may include a horizontal portion extending between the first turntable and the second turntable and a vertical support supporting the horizontal portion. The first camera may be mounted to the vertical support.

A second stretch wrapper dispenser may be adjacent the second turntable and a second camera may be directed toward the second turntable, such that the second turntable is between the second stretch wrapper dispenser and the second camera.

According to another embodiment, a validation system includes a platform weight sensor. A plurality of cameras are mounted about a periphery of the platform weight sensor and directed toward an area above the platform weight sensor. At least one computer receives images from the plurality of cameras and weight information from the platform weight sensor.

The computer may be programmed to analyze the images and identify a plurality of SKUs associated with a stacked plurality of items in the images. The computer may include a machine learning model trained on images of packages of beverage containers.

The validation system may further include a bullpen surrounding the platform weight sensor, with the plurality of cameras mounted to the bullpen. The plurality of cameras may include four cameras, one to capture each side of the loaded pallet.

The bullpen may include a gate pivotable between an open position and a closed position and one of the cameras may be mounted to the gate.

According to several embodiments, a turntable system includes a turntable including a weight sensor, a first ramp leading up to the turntable, and a second ramp leading down from the turntable.

The turntable system may include at least one camera positioned adjacent the turntable.

The turntable system may include a stretch wrapper dispenser mounted adjacent the turntable.

The turntable may include a hard stop preventing damage to the weight sensor caused by driving over the turntable with a pallet lift.

A method of handling loaded pallets includes carrying a first loaded pallet and a second loaded pallet over a first turntable and then placing the second loaded pallet on a second turntable. Then, the first loaded pallet is placed on the first turntable. The second loaded pallet is rotated on the second turntable and the first loaded pallet is rotated on the first turntable.

The method may include subsequently lifting the second loaded pallet and then lifting the first loaded pallet.

The method may further include subsequently carrying the first loaded pallet and the second loaded pallet over the second turntable.

In the method, the first loaded pallet and the second loaded pallet may be carried on tines, such as tines of a pallet lift (walkie-rider, pallet sled, pallet jack, etc) and the first loaded pallet and the second loaded pallet may be lifted with tines.

The method may include placing a wrap around the second loaded pallet during rotation.

The method may include image the second loaded pallet during rotation.

BRIEF DESCRIPTION OF THE DRAWINGS

FIG. 30 shows the modular turntable system of FIG. 28 reconfigured to use a single turntable.

FIG. 31 shows an example turntable support and frame.

FIG. 32 shows a schematic/section view through the turntable of FIG. 31.

DETAILED DESCRIPTION

Figure 1:
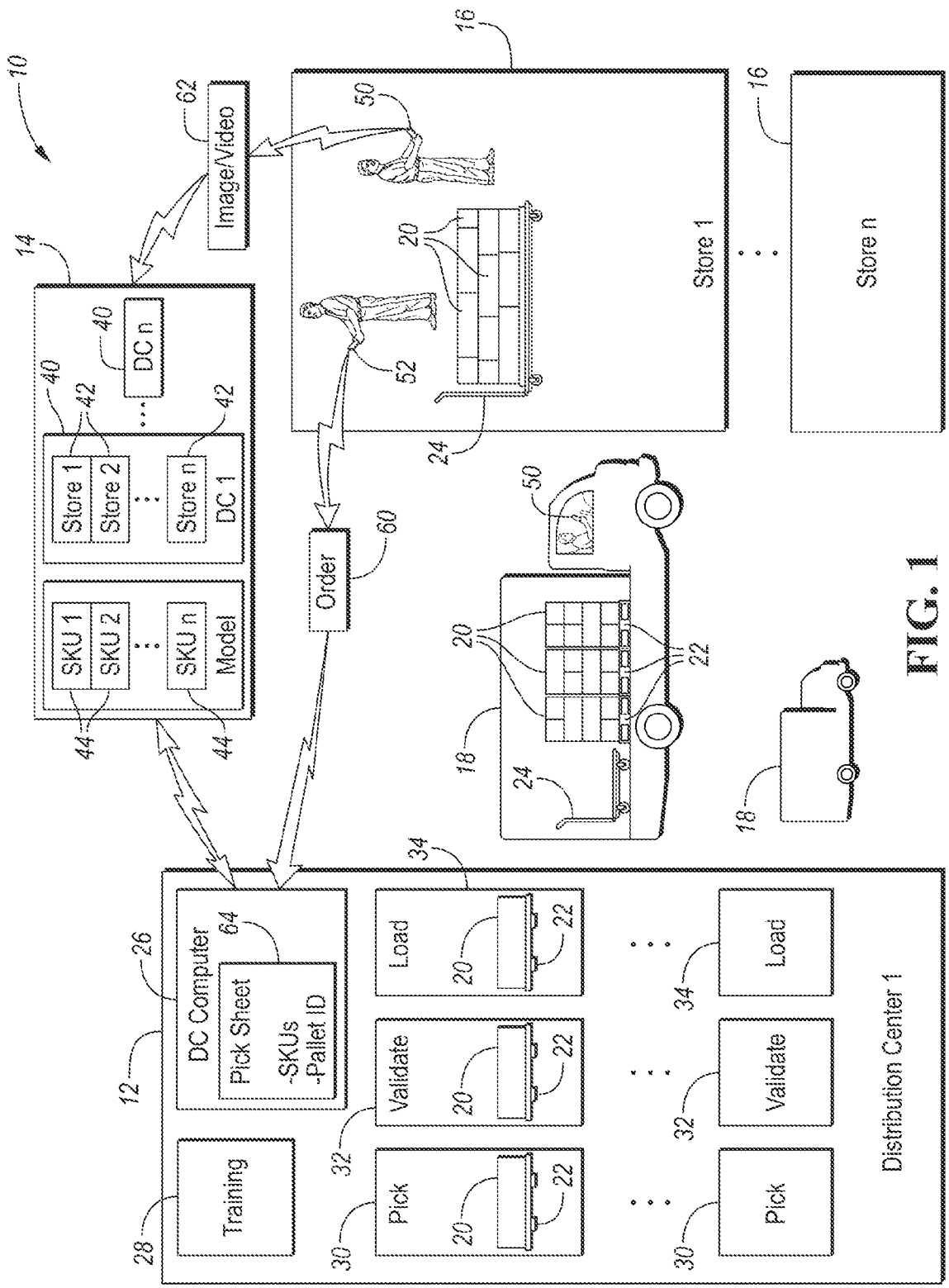
FIG. 1 is a schematic view of a delivery system.

FIG. 1 is a high-level view of a delivery system 10 including one or more distribution centers 12, a central server 14 (e.g. cloud computer), and a plurality of stores 16. A plurality of trucks 18 or other delivery vehicles each transport the products 20 on pallets 22 from one of the distribution centers 12 to a plurality of stores 16. Each truck 18 carries a plurality of pallets 22 which may be half pallets, each loaded with a plurality of goods 20 for delivery to one of the stores 16. A wheeled sled 24 is on each truck 18 to facilitate delivery of one or more pallets 22 of goods 20 to each store 16. Generally, the goods 20 could be loaded on the half pallets 22, full-size pallets, carts, or hand carts, or dollies—all considered "platforms" herein.

Each distribution center 12 includes one or more pick stations 30 and one or more validation stations 32. Each distribution center 12 includes one or more loading stations 34, such as a loading dock for loading the trucks 18.

Each distribution center 12 may have a plurality of loading stations 34. Each distribution center 12 includes a DC computer 26. The DC computer 26 receives orders 60 from the stores 16 and communicates with the central server 14. Each DC computer 26 receives orders and generates pick sheets 64, each of which contains a list and quantity of SKUs. Alternatively, the orders 60 can be sent from the DC computer 26 to the central server 14 for generation of the pick sheets 64, which are synced back to the DC computer 26.

Some or all of the distribution centers 12 may include a training station 28 for generating image information and other information about new products 20 which can be transmitted to the central server 14 for analysis and future use.

The central server 14 may include a plurality of distribution center accounts 40, including DC1-DCn, each associated with a distribution center 12. Each DC account 40 includes a plurality of store accounts 42, including store 1-store n. The orders 60 and pick sheets 64 for each store are stored in the associated store account 42. The central server 14 further includes one or more machine learning models trained based upon a plurality of SKU files 44, including SKU 1-SKUn. The models are periodically synced to the DC computers 26.

The SKU files 44 each contain information for a SKU. A "SKU" may be a single variation of a product that is available from the distribution center 12 and can be delivered to one of the stores 16. Each product in the distribution center 12 is associated with one SKU. For example, each SKU may be associated with a particular number of containers (e.g. 12-pack) in a particular form (e.g. can v bottle) of a particular size (e.g. 24 ounces), with particular packaging (cardboard vs reusable plastic crate, etc), and containing a particular beverage. This information is contained in each SKU file 44 along with the name of the product, a description of the product, dimensions of the product, and image information for the product. Each SKU file 44 may also include the weight of the product. In general, all the SKU files 44 including their associated image information, may be generated through the training module 28. The machine learning models are trained based upon the image information for the SKUs.

Figure 2:
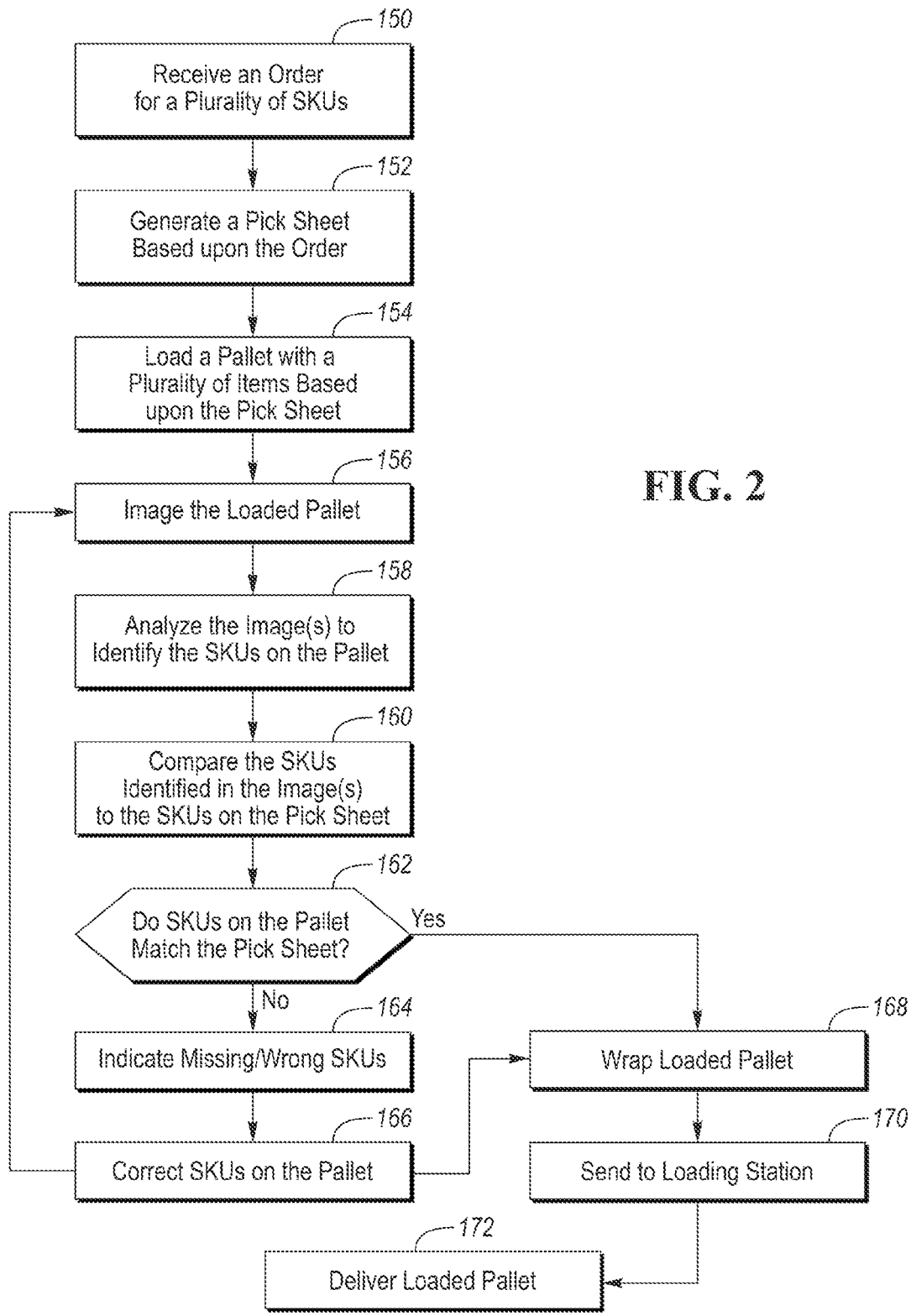
FIG. 2 is a flowchart of one method for delivering items.

Referring also to the flowchart in FIG. 2, an order 60 may be received from a store 16 in step 150. As an example, an order 60 may be placed by a store employee using an app or mobile device 52. The order 60 is sent to the distribution center computer 26 (or alternatively to the server 14, and then relayed to the proper (e.g. closest) distribution center computer 26). The distribution center computer 26 analyzes the order 60 and creates a pick sheet 64 associated with that order 60 in step 152. The pick sheet 64 assigns each of the SKUs (including the quantity of each SKU) from the order. The pick sheet 64 specifies how many pallets 22 will be necessary for that order (as determined by the DC computer 26). The DC computer 26 may also determine which SKUs should be loaded near one another on the same pallet 22, or if more than one pallet 22 will be required, which SKUs should be loaded on the same pallet 22.

Figure 3:
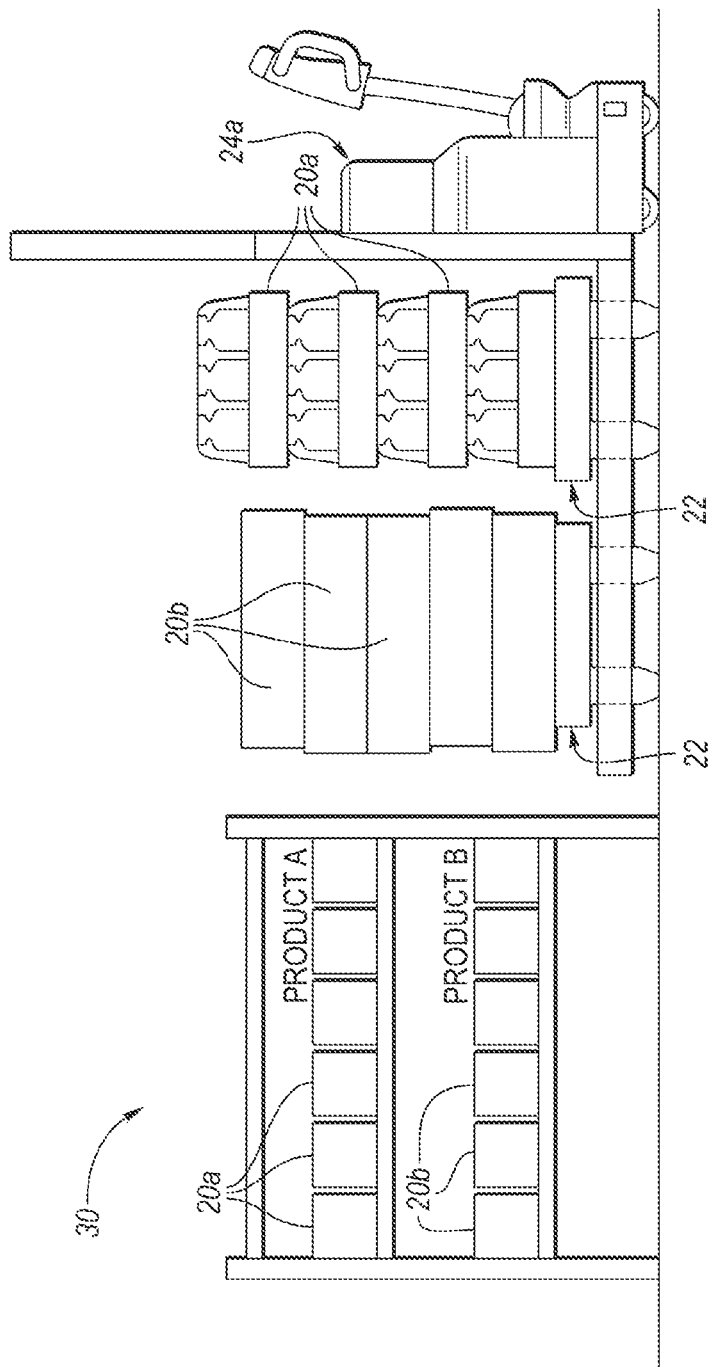
FIG. 3 shows an example loading station of the delivery system of FIG. 1.

FIG. 3 shows a portion of an example pick station 30 of FIG. 1. Referring to FIGS. 1 and 3, workers at the distribution center read the palled id (e.g. via rfid, barcode, etc) on the pallet(s) 22 on a pallet jack 24a, such as with a mobile device or a reader on the pallet jack 24*a*. Shelves may contain a variety of items 20 for each SKU, such as first product 20*a* of a first SKU and a second product 20*b* of a second SKU (collectively "products 20"). In practice, there will be products associated with hundreds or thousands of different SKUs. A worker reading a computer screen or mobile device screen displaying from the pick sheet 64 retrieves each product 20 and places that product 20 on one of the pallets 22, which may be as instructed by the computer screen or mobile device screen. Alternatively, the pallet 22 may be loaded by automated handling equipment. Workers place items 20 on the pallets 22 according to the pick sheets 64 and the pallet ids are reported to the DC computer 26 in step 154.

After the two pallets 22 are loaded, the next pallet 22 (or two pallets 22) is brought to the pick station 30, until all of the SKUs required by the pick sheet 64 are loaded onto as many pallets 22 as required by that pick sheet 64. Pallets 22 are then loaded for the next pick sheet 64. The DC computer 26 records the pallet ids of the pallet(s) 22 that have been loaded with particular SKUs for each pick sheet 64. The pick sheet 64 may associate each pallet id with each SKU.

After being loaded, each loaded pallet 22 is validated at the validation station 32, which may be adjacent to or part of the pick station 30. As will be described in more detail below, at least one still image, and preferably four still images, of the products 20 on the pallet 22 is taken at the validation station 32 in step 156 of FIG. 2. Preferably a still image of each of the four sides of the loaded pallet 22 is taken. The pallet id of the pallet 22 is also read. The images are analyzed (for example, with the machine learning models) to determine the SKUs of the products 20 that are currently on the identified pallet 22 in step 158. The SKUs of the products 20 on the pallet 22 are compared to the pick sheet 64 by the DC computer 26 in step 160, to ensure that all the SKUs associated with the pallet id of the pallet 22 on the pick sheet 64 are present on the correct pallet 22, and that no additional SKUs are present.

Figure 4:
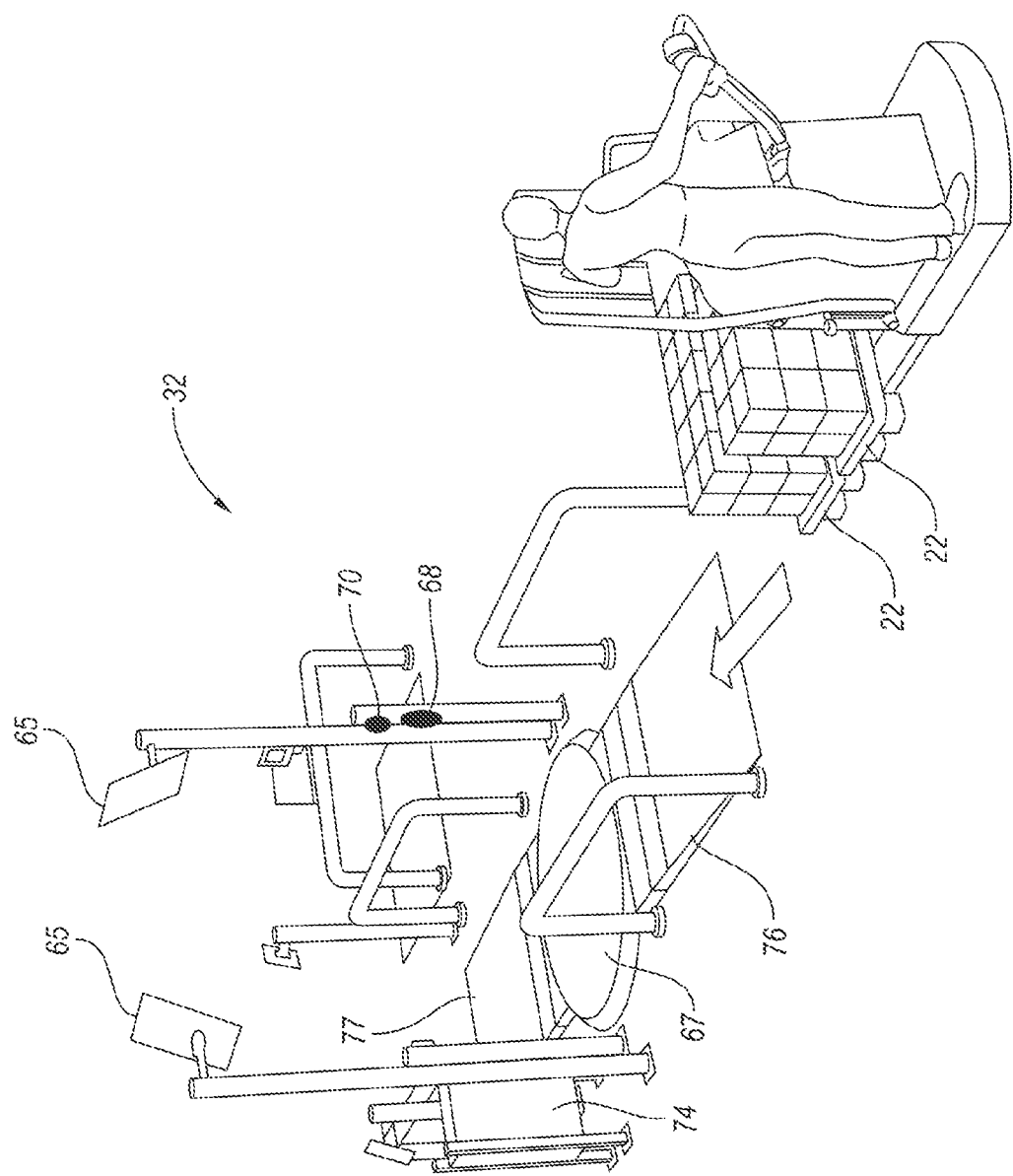
FIG. 4 shows an example validation station of the delivery system of FIG. 1.

FIGS. 4 to 11 show an example validation station that could be used in the system of FIG. 1. Referring to FIG. 4, the validation station may include a turntable 67 with at least one camera 68 and rfid reader 70 (and/or barcode reader) mounted adjacent thereto. Lights 65 are directed toward the turntable 67. A first ramp 76 may lead from the floor to the turntable 67 and a second ramp 77 may lead from the turntable 67 to the floor. A weight sensor may be incorporated into the turntable 67.

Figure 5:
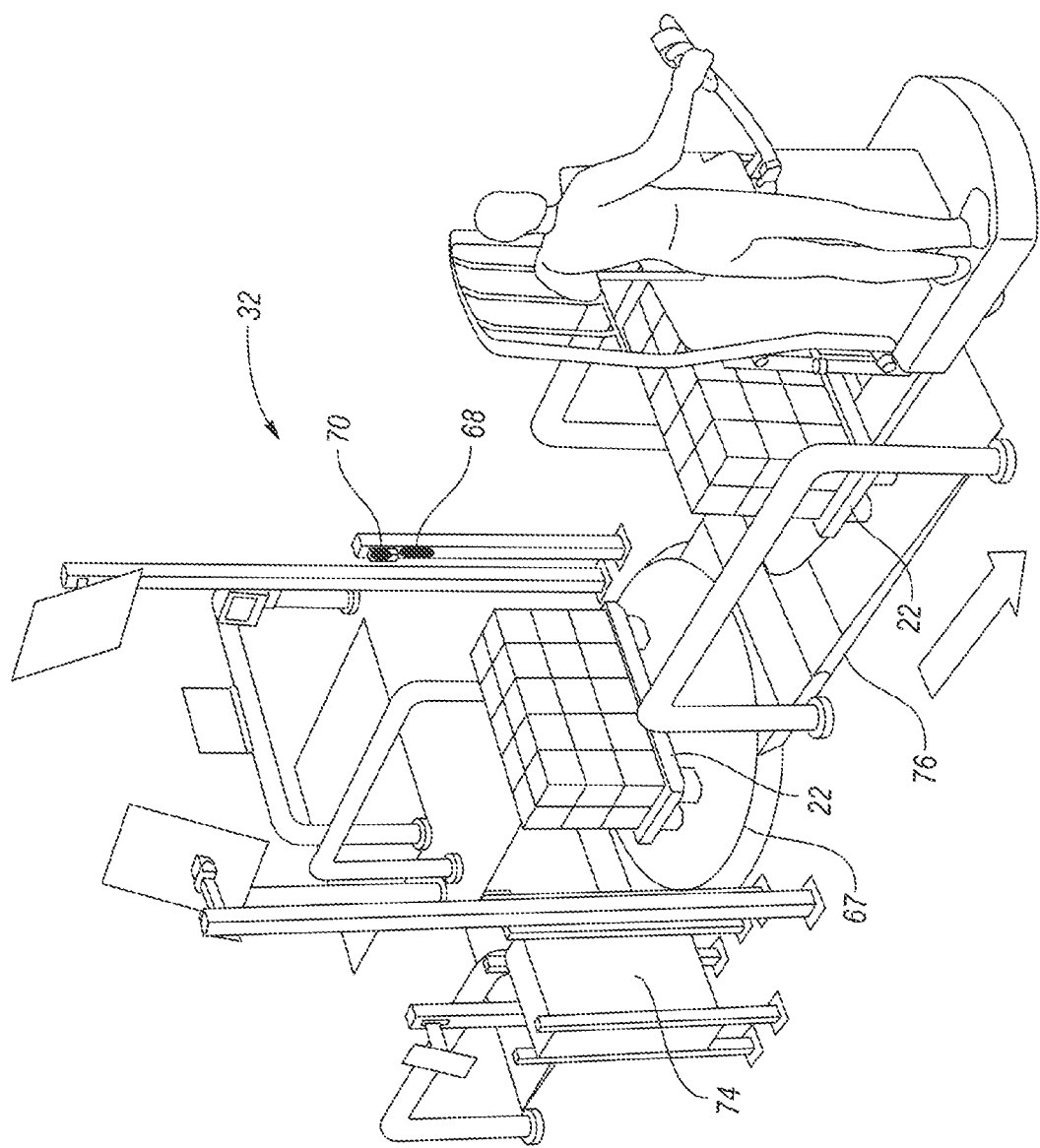
FIG. 5 is another view of the example validation system of FIG. 3 with a loaded pallet thereon.
Figure 6:
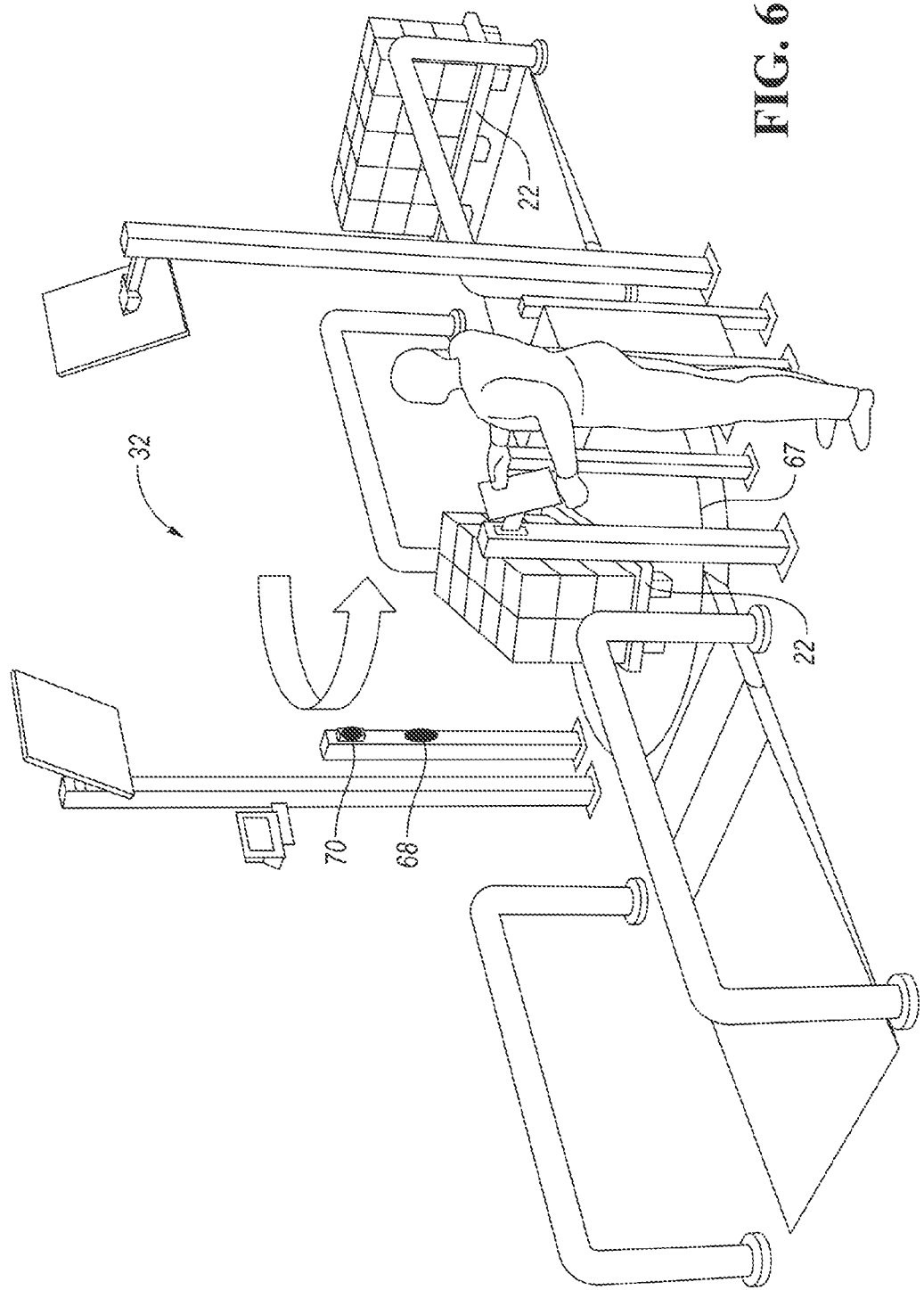
FIG. 6 shows the validation system of FIG. 5 in the process of wrapping a loaded pallet.

As shown in FIG. 5, the operator may place one loaded pallet 22 on the turntable 67 and another on or near the turntable 67, such as on the ramp 76. Referring to FIG. 6, the operator uses a tablet (or other device with UI) to start the validation. The camera 68 takes at least one image of the loaded pallet 22 while the turntable 67 is rotating the loaded pallet 22. Alternatively, the camera 68 can be rotated around the loaded pallet 22. Again, preferably four still images are taken, one of each side of the loaded pallet 22.

The rfid reader 70 (or barcode reader, or the like) reads the pallet id (a unique serial number) from the pallet 22. The validation station 32 includes a local computer 74 in communication with the camera 68, rfid reader 70 and weight sensor. The computer 74 controls the turntable 67 and lights 65. The computer 74 can communicate with the DC computer 26 (and/or server 14) via a wireless network card. The image(s) and the pallet id are sent to the server 14 via the network and associated with the pick list 64 (FIG. 1). The total weight of the expected products 20 (according to the pick list 64) and pallet 22 can be compared to the measured weight on the turntable 67 for confirmation.

Figure 7:
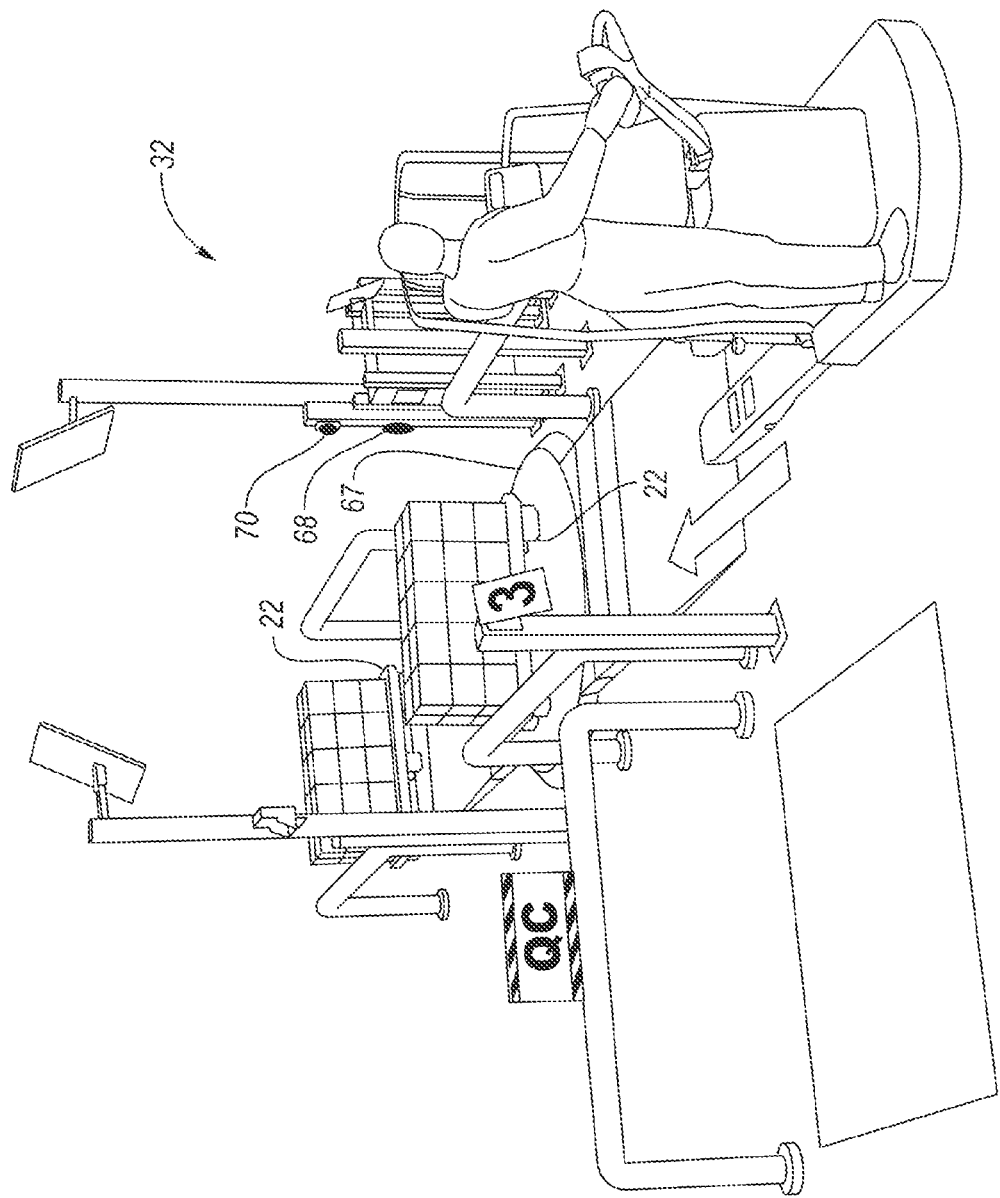
FIG. 7 shows the validation system of FIG. 5 upon a successful validation.

Referring to FIG. 7, if the loaded pallet 22 is validated successfully, the tablet so indicates. The operator picks up the pallet 22 and is directed to the correct dock door by the tablet.

Figure 8:
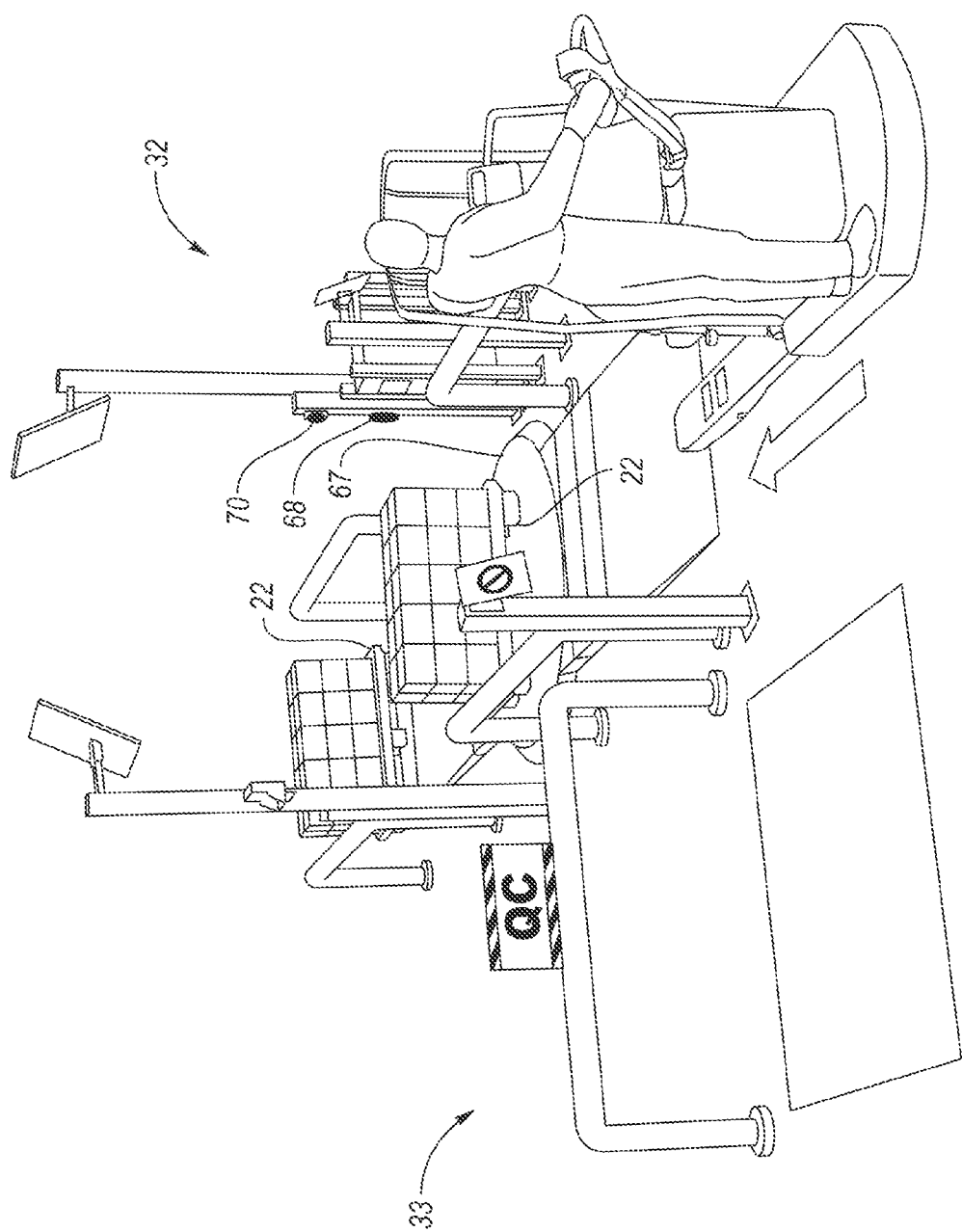
FIG. 8 shows the validation system of FIG. 5 upon a unsuccessful validation.

Referring to FIG. 8, if the validation station detects an error in the loaded pallet 22, an alert is generated, such as via the tablet. The operator is directed (such as by the tablet) to take the pallet 22 to a QC station 33 for a QC check.

Figure 9:
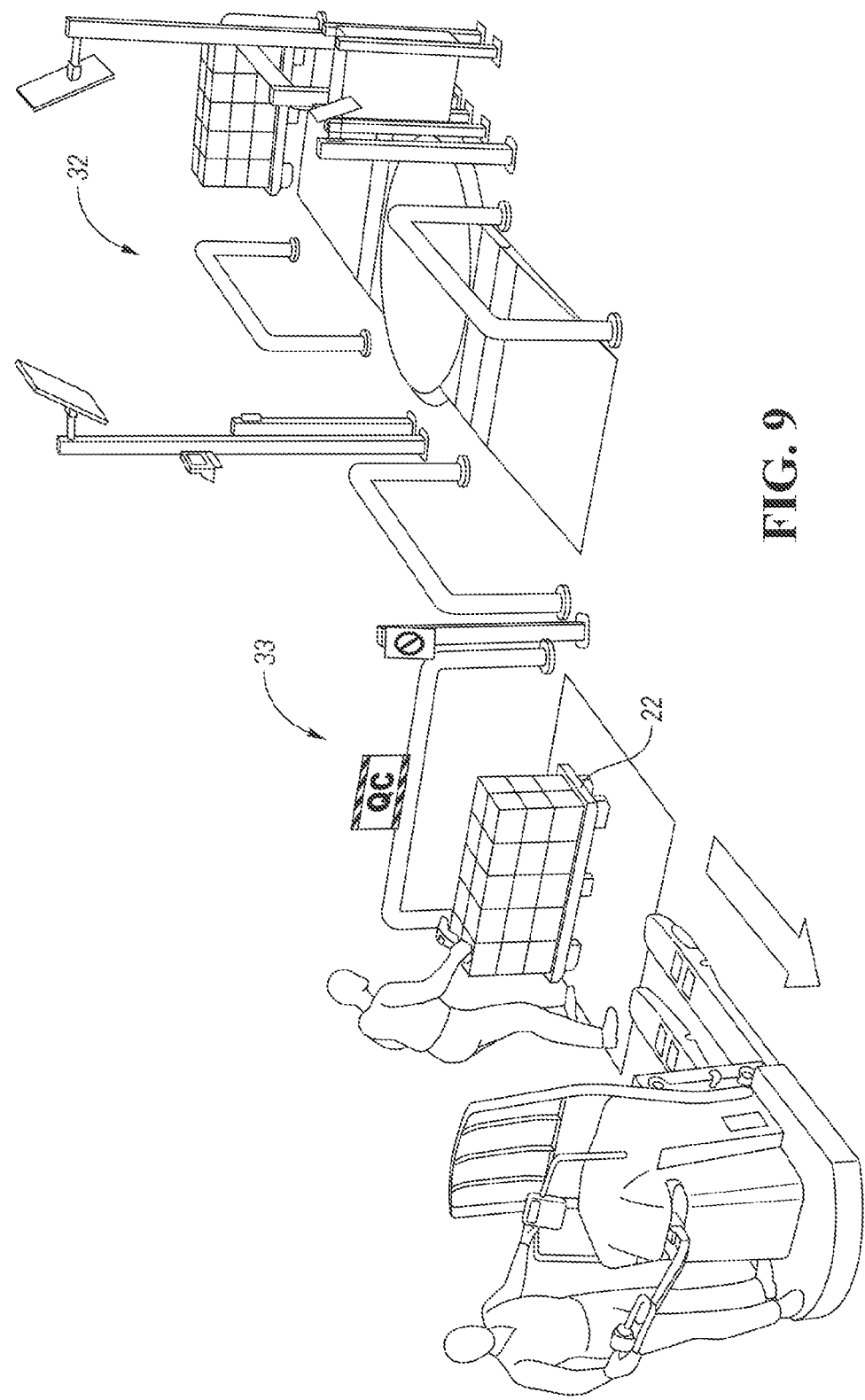
FIG. 9 shows the loaded pallet at a QC station after an unsuccessful validation.

In FIG. 9, the operator places the pallet 22 at the QC station 33 for physical inspection. A tablet at the QC station 33 displays the necessary information to the audit operator, e.g. which SKUs are missing and/or which SKUs are present on the pallet 22 but should not be.

Figure 10:
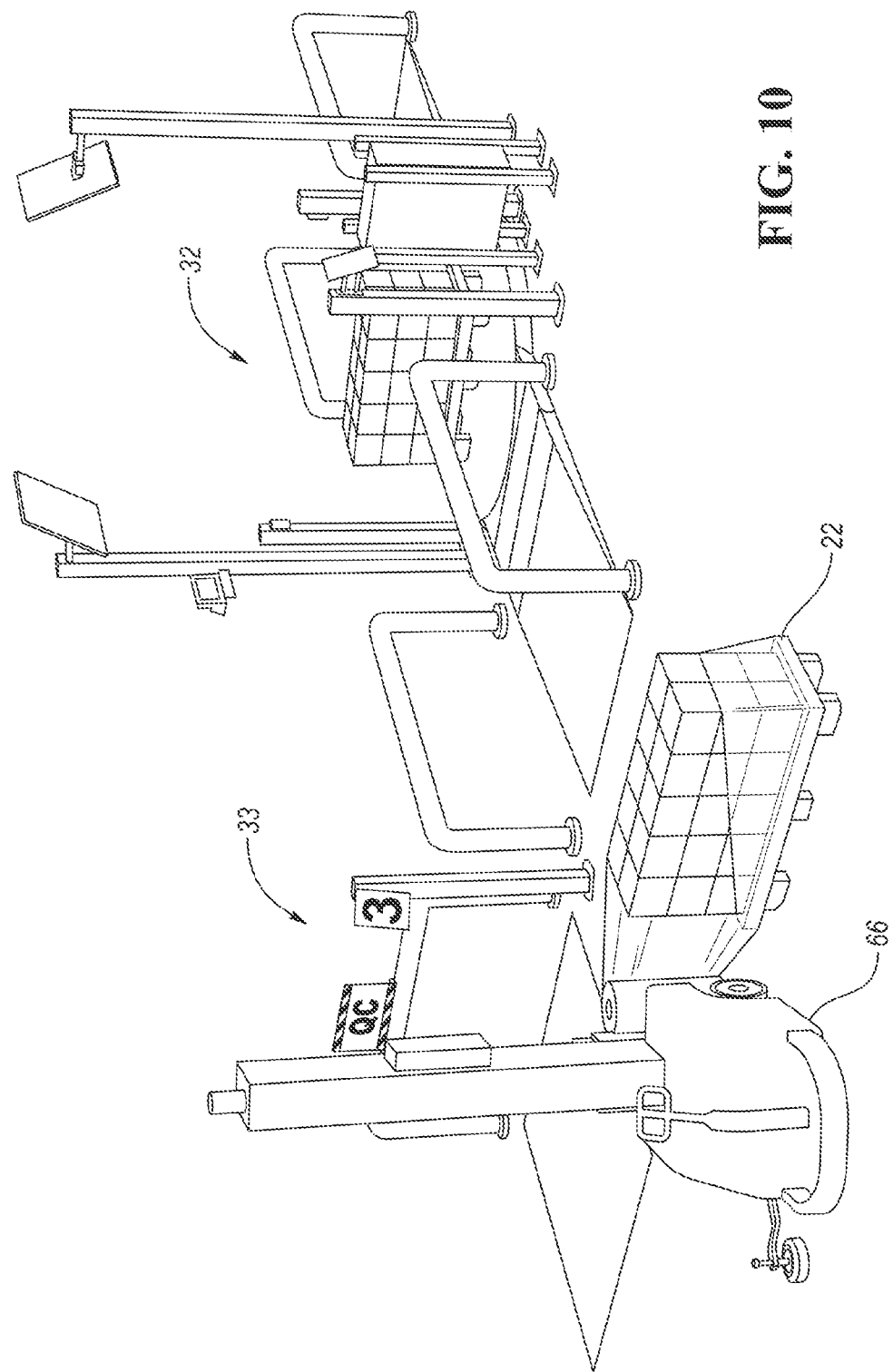
FIG. 10 shows the loaded pallet of FIG. 5 being wrapped by a robo wrapper.
Figure 11:
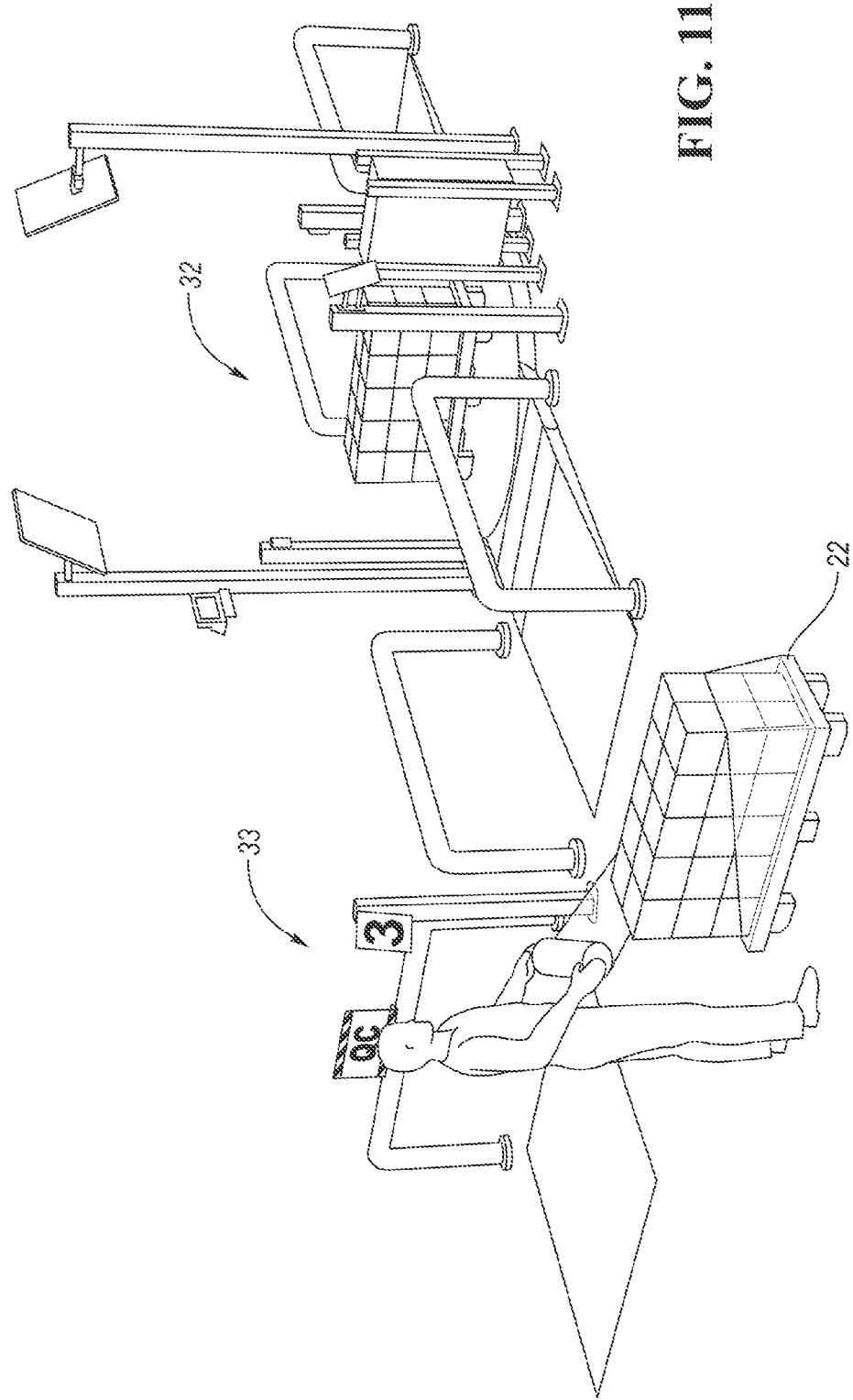
FIG. 11 shows the loaded pallet of FIG. 5 being wrapped manually.

In FIG. 10, after validation or after correction in the QC station 33, the pallet 22 can be wrapped with a robo wrapper 66. Alternatively, as shown in FIG. 11, the pallet 22 can be wrapped manually.

Figure 12:
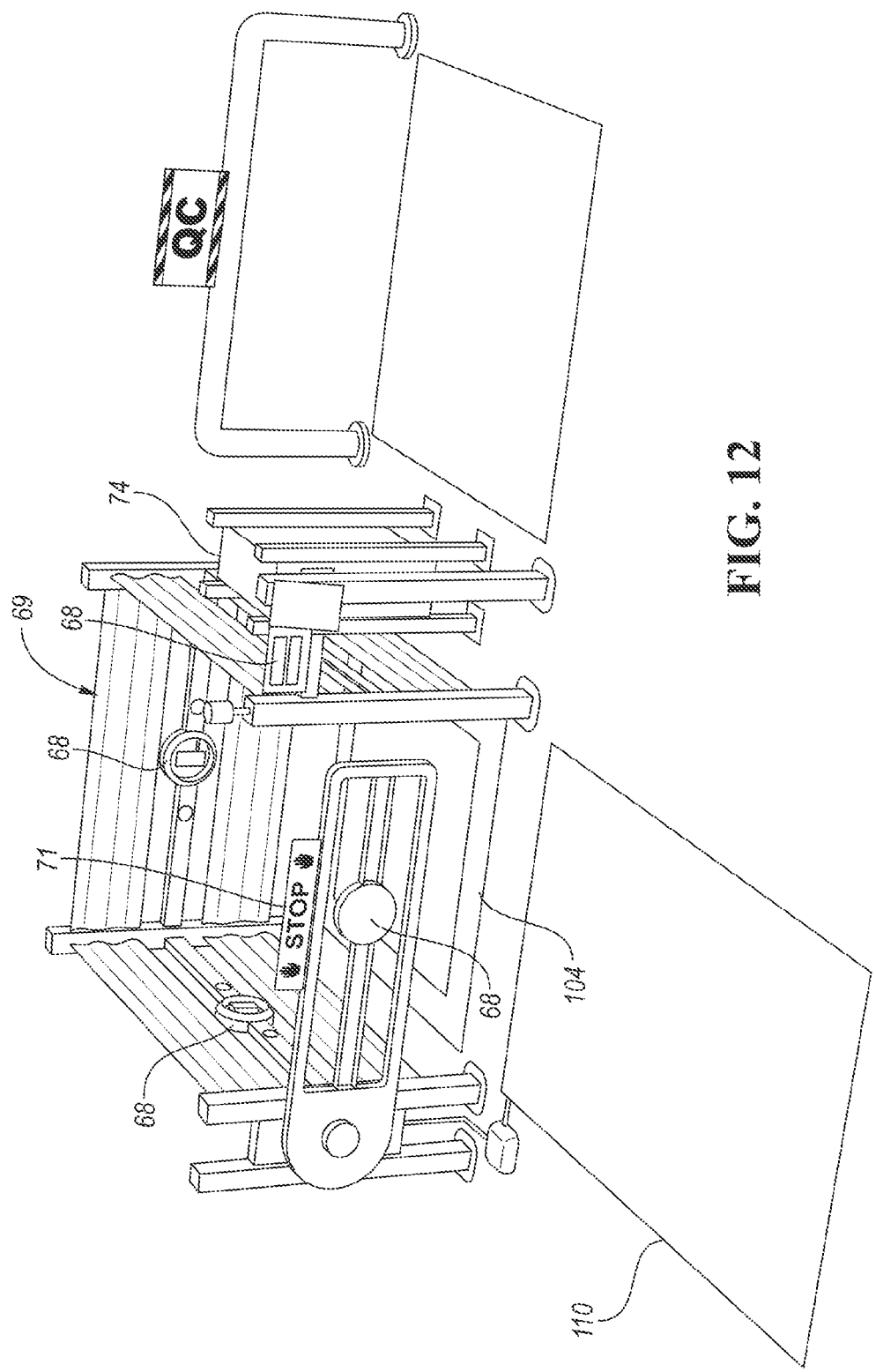
FIG. 12 shows a validation station according to another embodiment.
Figure 13:
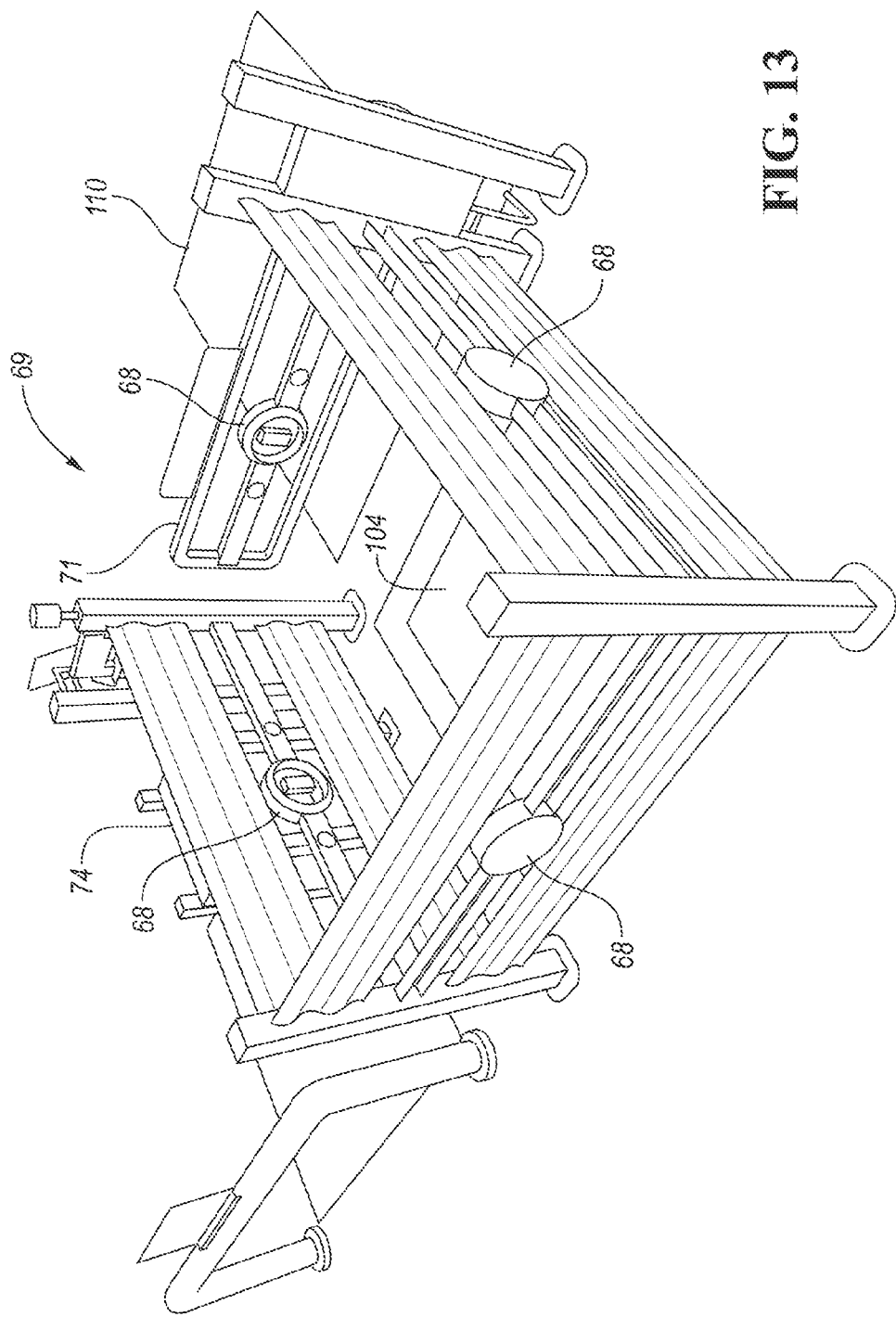
FIG. 13 is a rear perspective view of the validation station of FIG. 12.

FIGS. 12 to 24 show another embodiment of a validation station. In FIGS. 12 and 13, the validation station includes a bullpen 69 having a gate 71 surrounding a platform weight sensor 104 (e.g. a platform supported by load cells). Four cameras 68 are mounted to the bullpen 69, one on each of the three sides of the bullpen 69 and one on the gate 71. The gate 71 may be configured to open upon sufficient weight on a platform 110 just outside the gate 71. Again, the computer 74 receives the images from the cameras 68 and the weight from the platform weight sensor 104. The computer 74 is also programmed to control the gate 71 as described herein.

Figure 14:
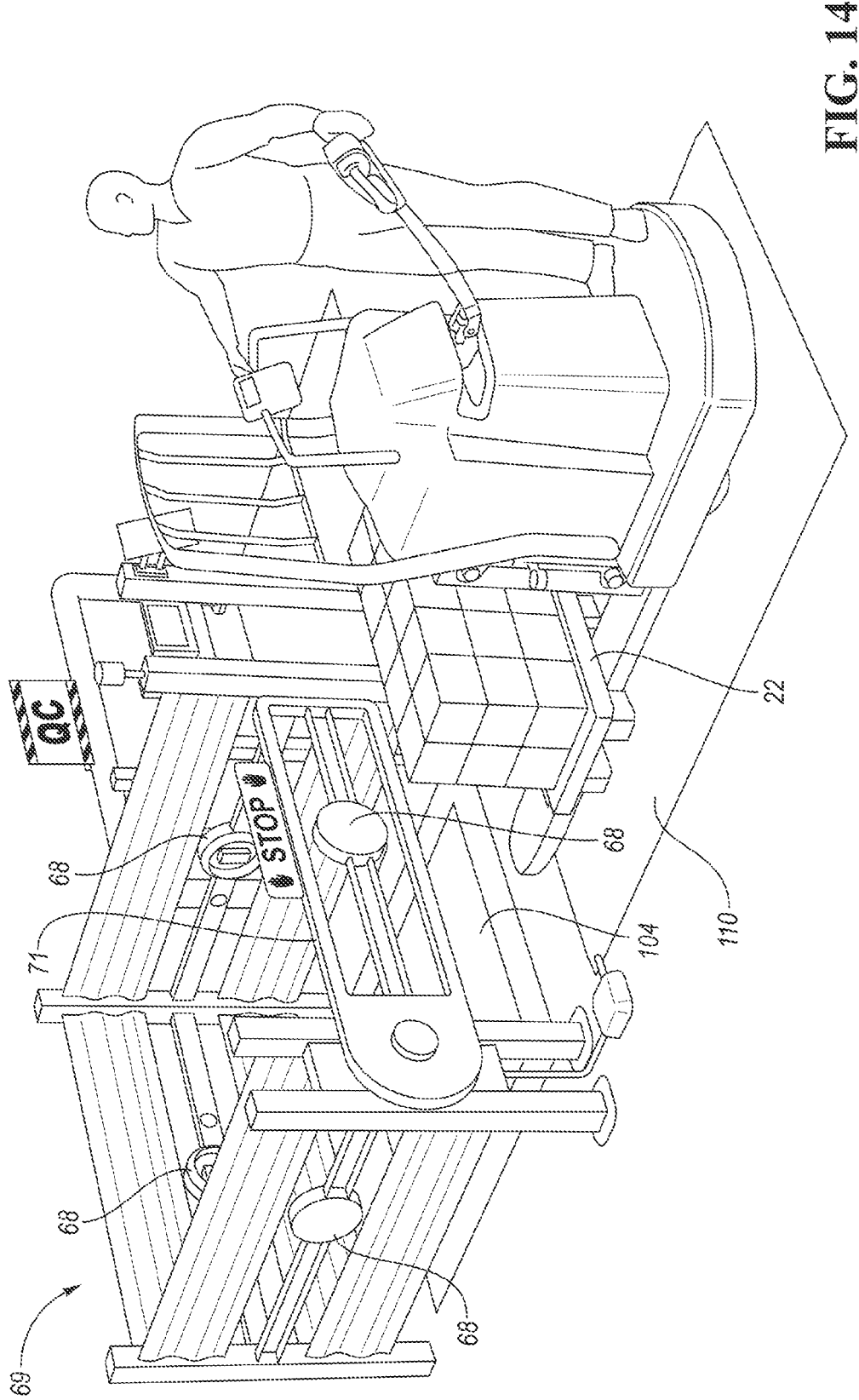
FIG. 14 shows an operator approaching the validation station of FIG. 12 with a loaded pallet.
Figure 15:
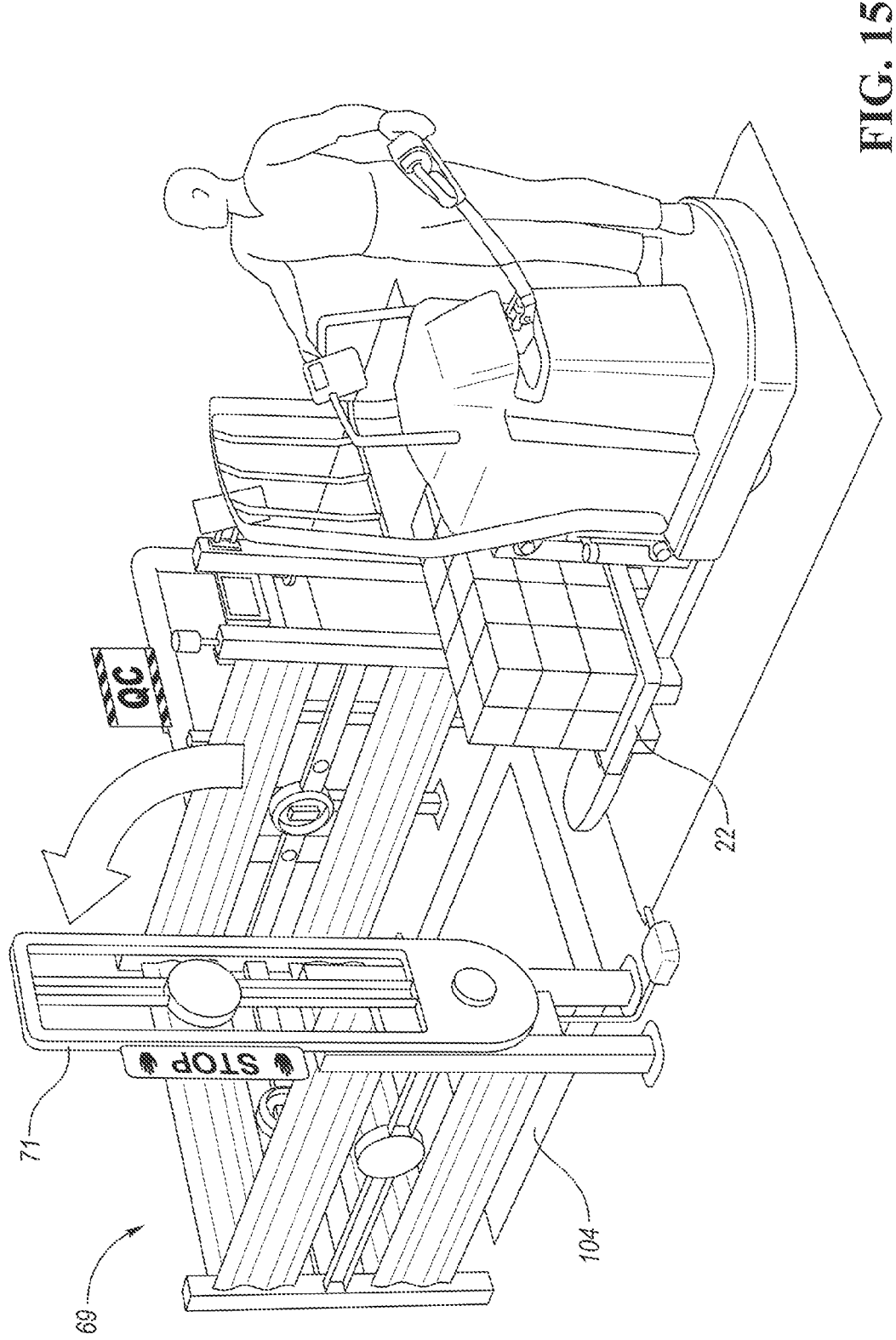
FIG. 15 shows the validation station lifting the gate in response to the operator approach.

Referring to FIG. 14, when the operator pulls up onto the platform 110 adjacent the bullpen 69 with the loaded pallet 22 on the lift, the gate 71 opens automatically, as shown in FIG. 15. The computer 74 receives a signal from the platform 110 indicating weight on the platform 110 and generates a signal causing the gate 71 to open.

Figure 16:
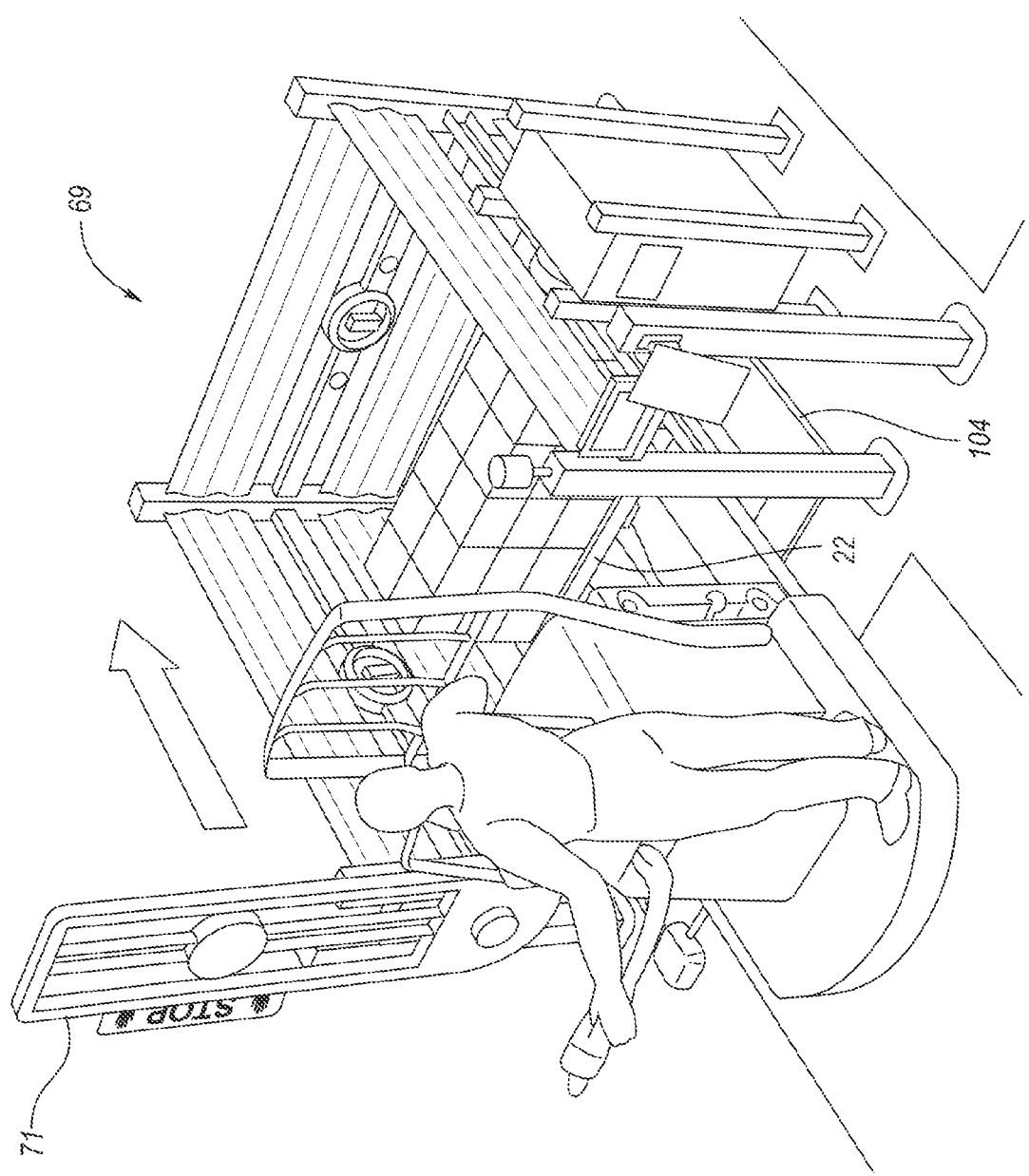
FIG. 16 shows the operator placing the loaded pallet on the platform weight sensor of the validation station of FIG. 12.
Figure 17:
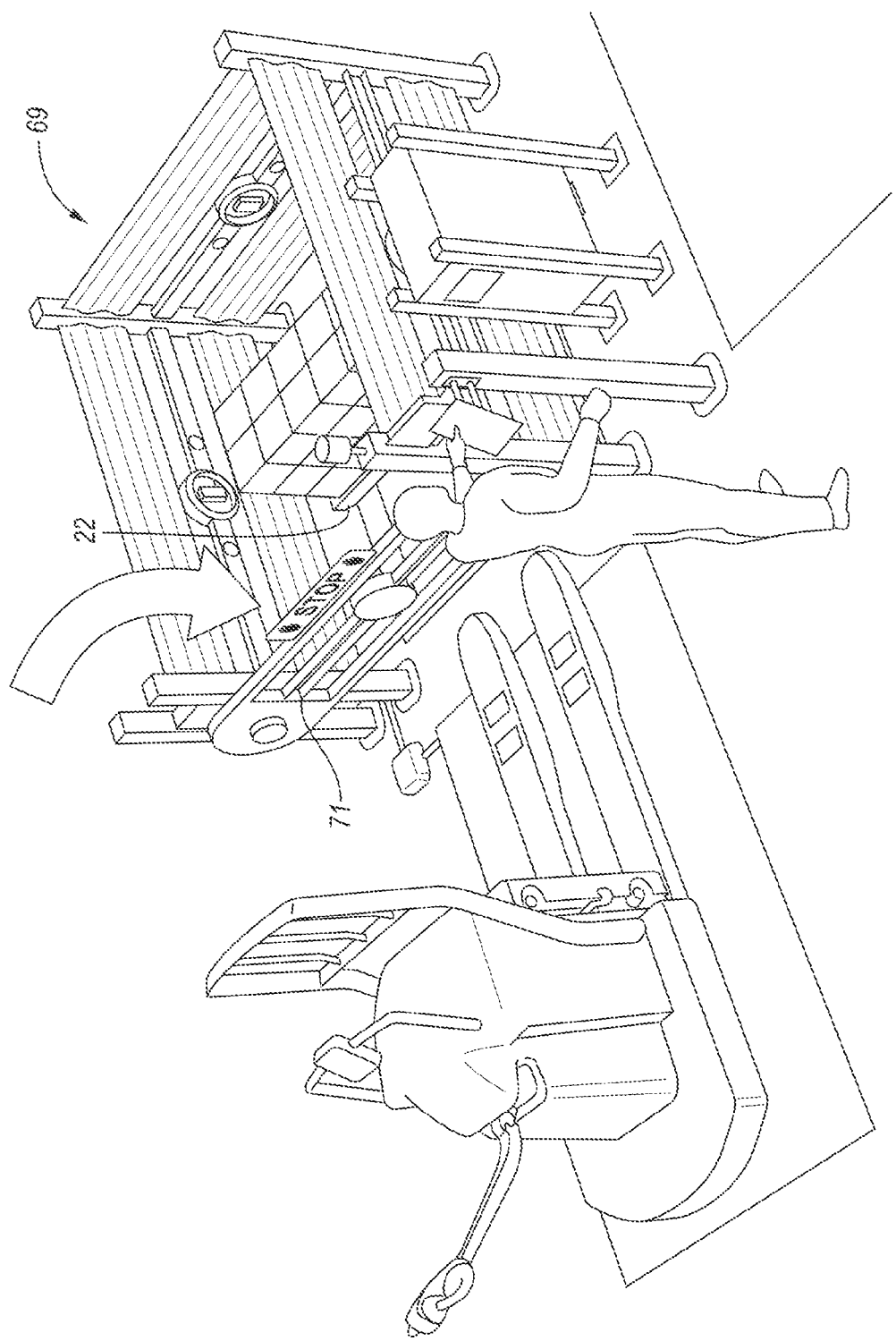
FIG. 17 shows the gate of the validation station of FIG. 16 closed.

Referring to FIG. 16, the operator places the pallet 22 on the platform weight sensor 104 inside the bullpen 69 and leaves the bullpen 69. The gate 71 closes (FIG. 17).

Figure 18:
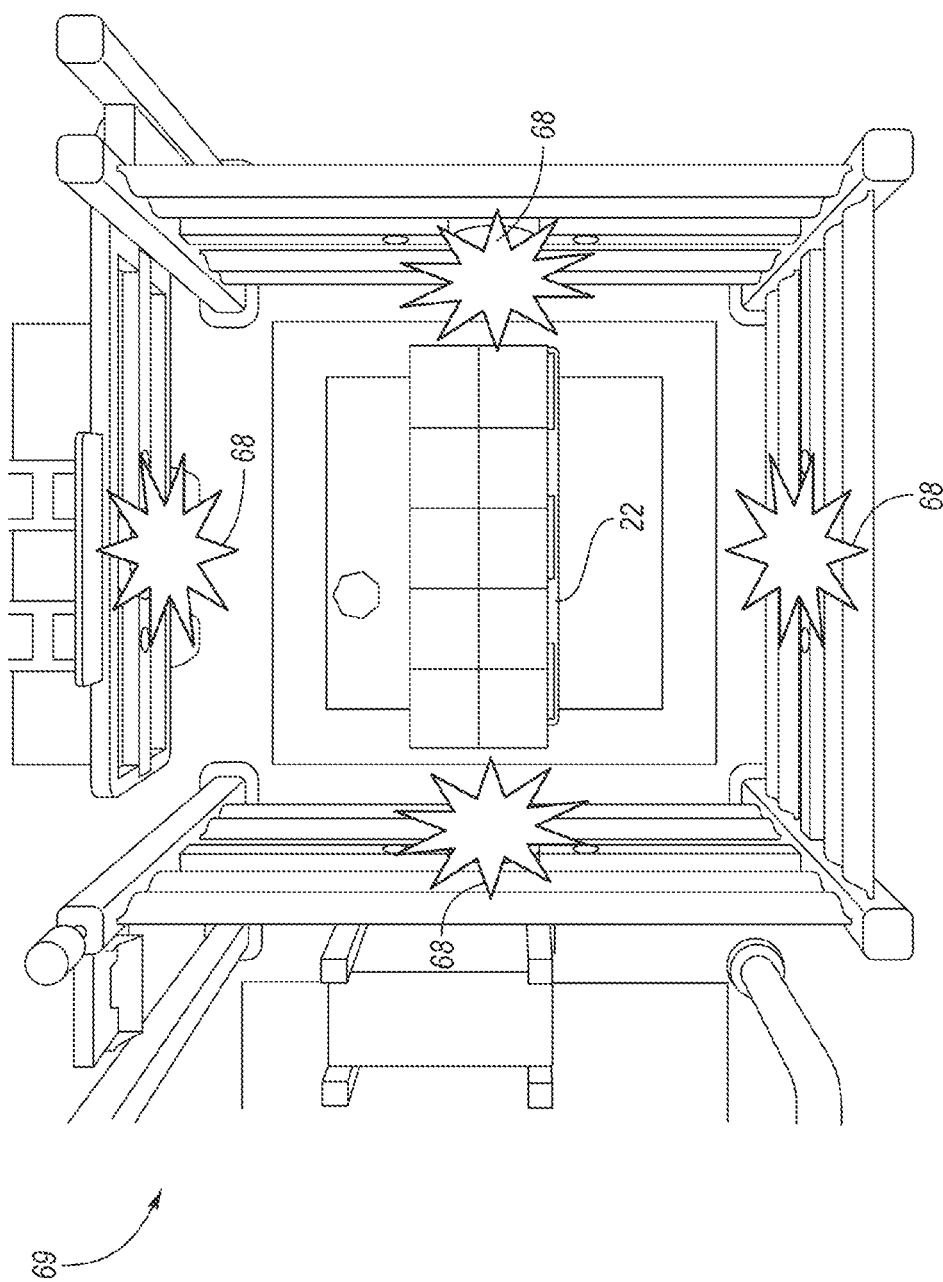
FIG. 18 is a top view of the validation station of FIG. 17 indicating the four cameras each taking a picture of the loaded pallet.

In FIG. 18, the four cameras 68 each take an image of one side of the loaded pallet 22, which could happen simultaneously or rapidly in sequence. The weight sensor 104 measures the weight of the loaded pallet 22. The computer 74 receives the four images and the weight measurement. The images are evaluated by using the machine learning models (for example) to identify the SKUs associated with every item on the pallet 22, as described above. The identified SKUs are compared to the expected SKUs from the pick list.

Figure 19:
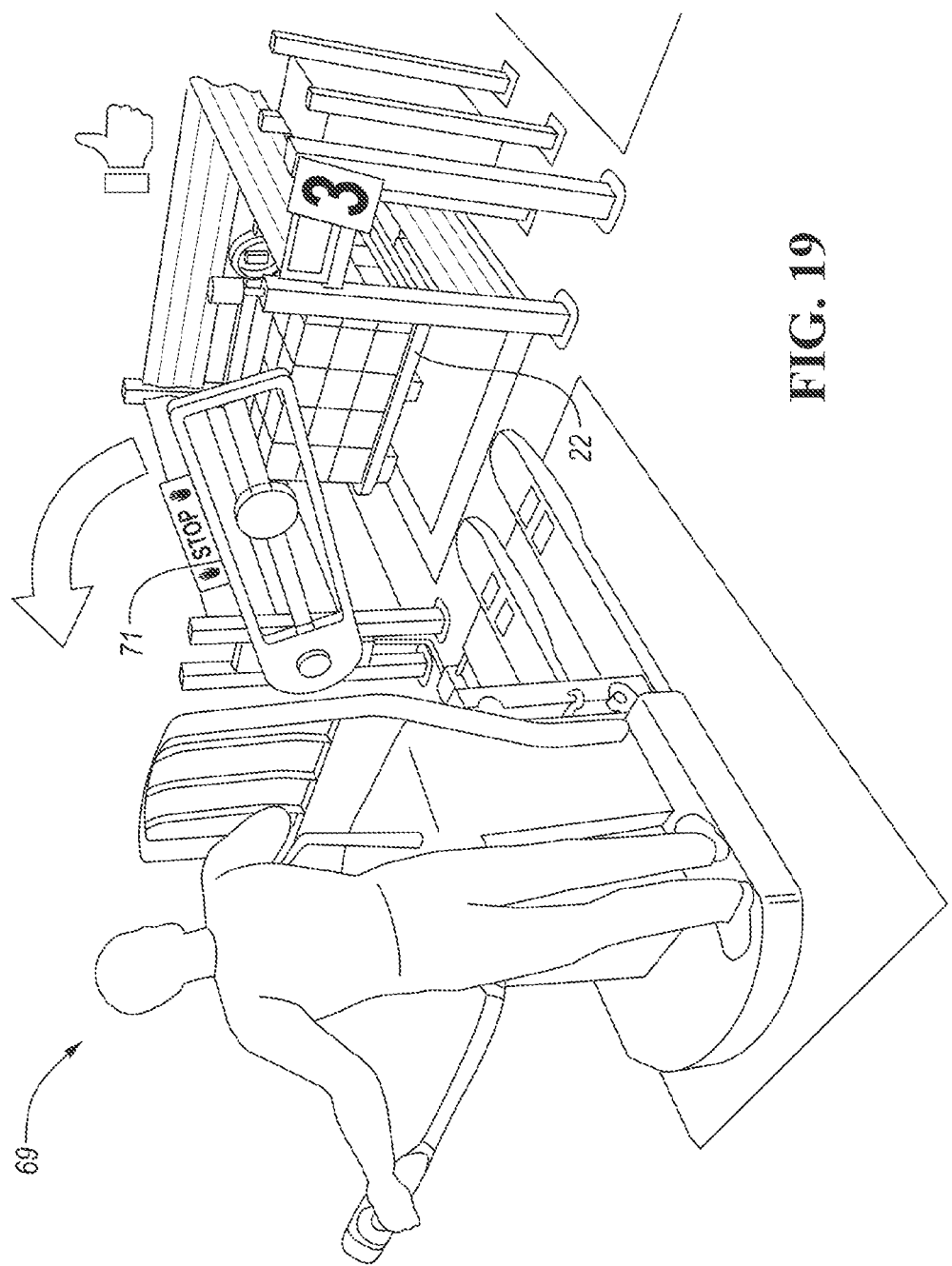
FIG. 19 shows the validation station indicating a successful validation.
Figure 20:
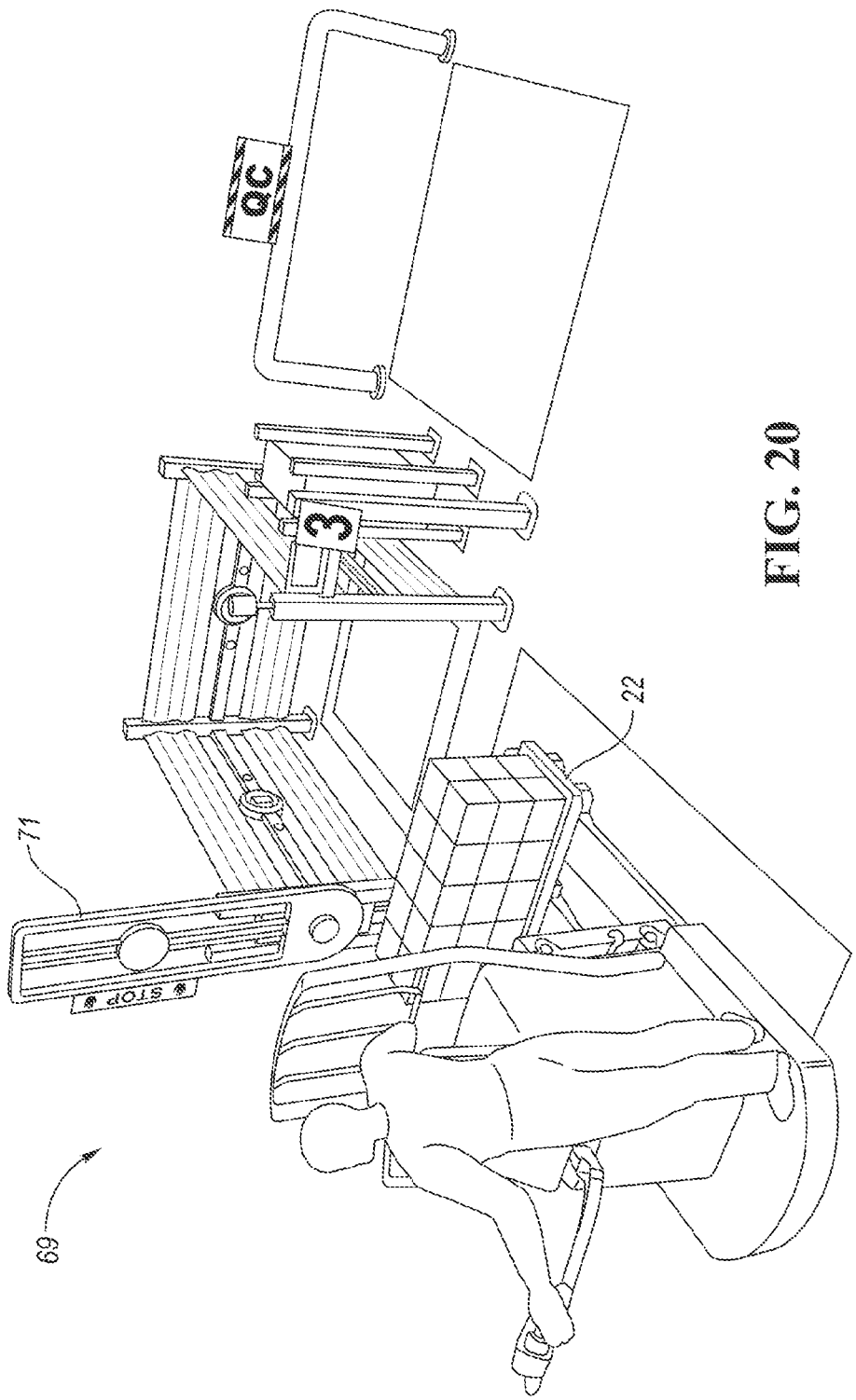
FIG. 20 shows the gate of the validation station opening automatically after successful validation.

Referring to FIGS. 19 and 20, if the loaded pallet 22 is validated, then the gate 71 opens automatically, and a tablet indicates validation and the tablet indicates the dock door to which the operator should bring the loaded pallet 22.

Figure 21:
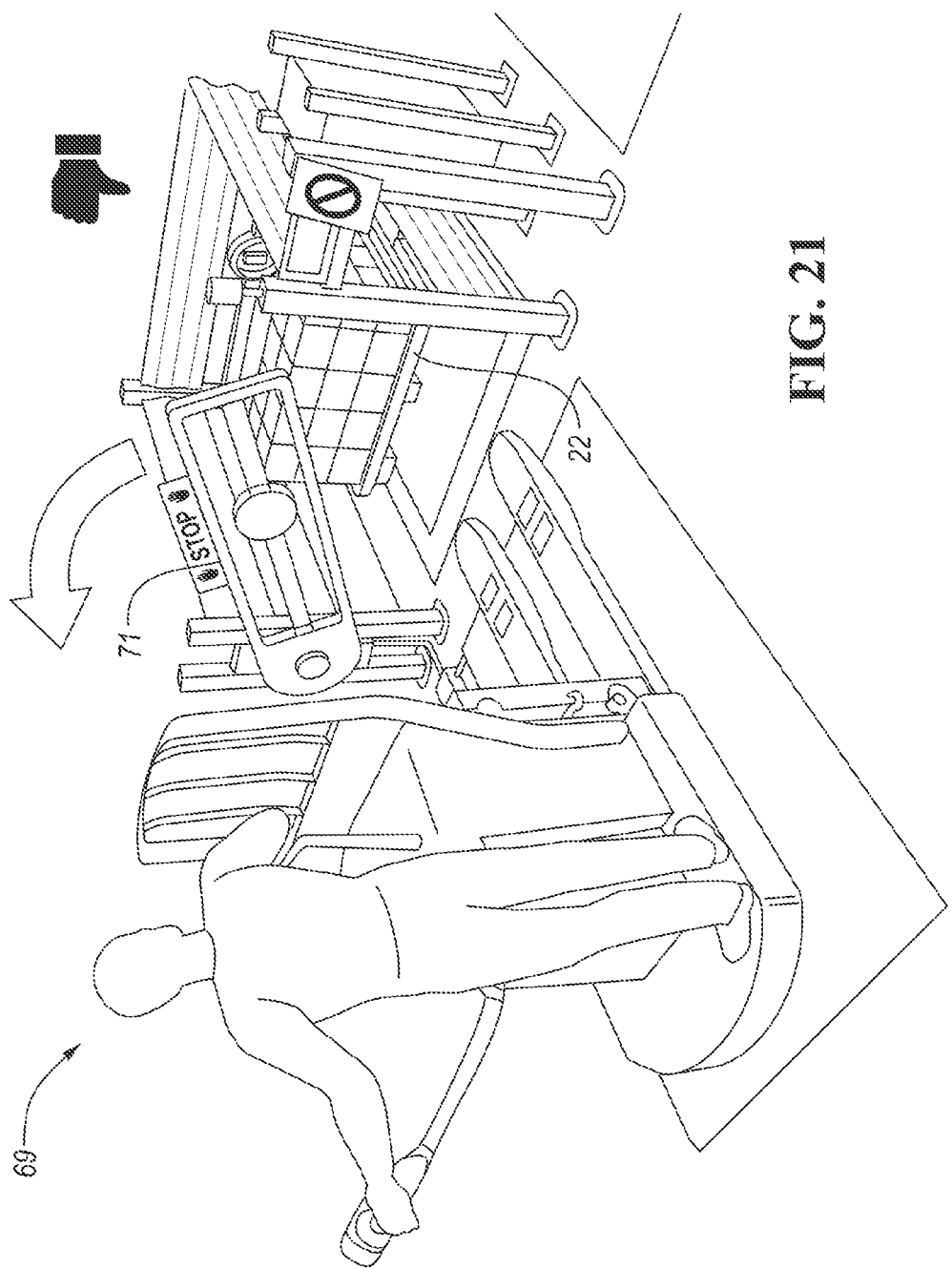
FIG. 21 shows an unsuccessful validation by the validation station of FIG. 12.
Figure 22:
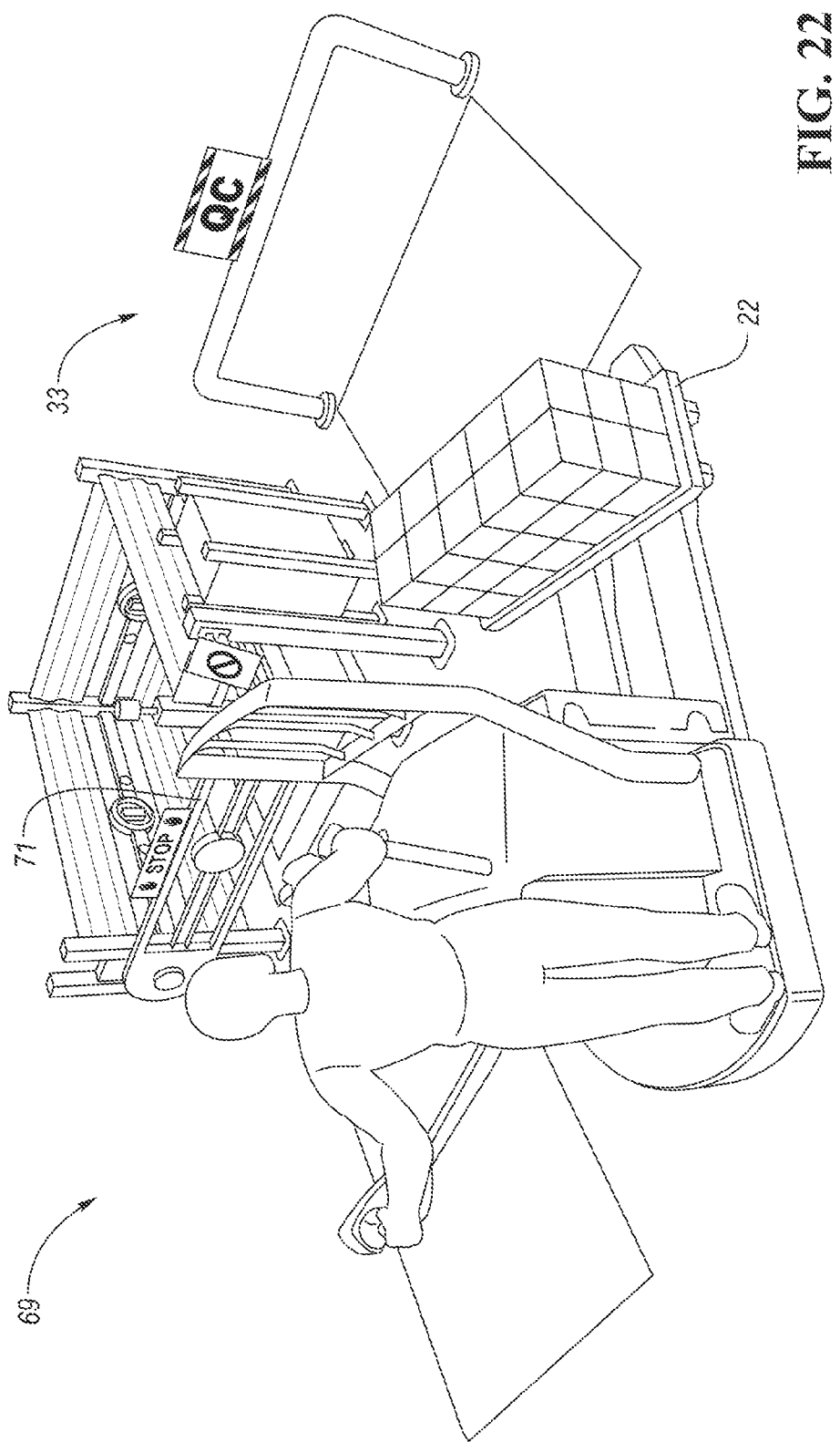
FIG. 22 shows the operator taking the loaded pallet to a QC station after an unsuccessful validation.
Figure 23:
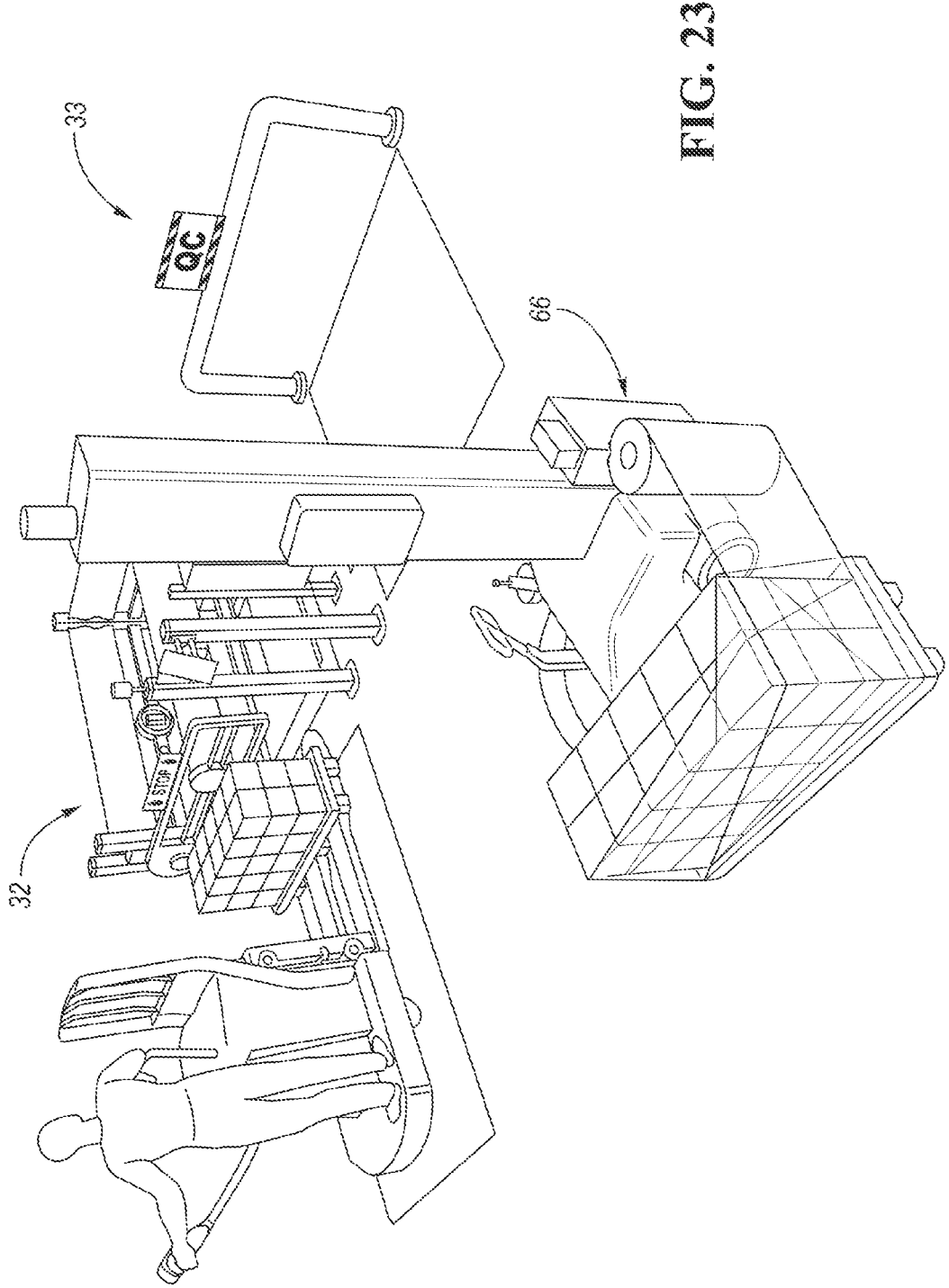
FIG. 23 shows the loaded pallet being wrapped by a robo wrapper after validation or correction.

Referring to FIGS. 21 and 22, if validation fails, the gate 71 again opens automatically. The tablet indicates failure and instructs the operator to take the pallet 22 to the QC station 33.

Figure 24:
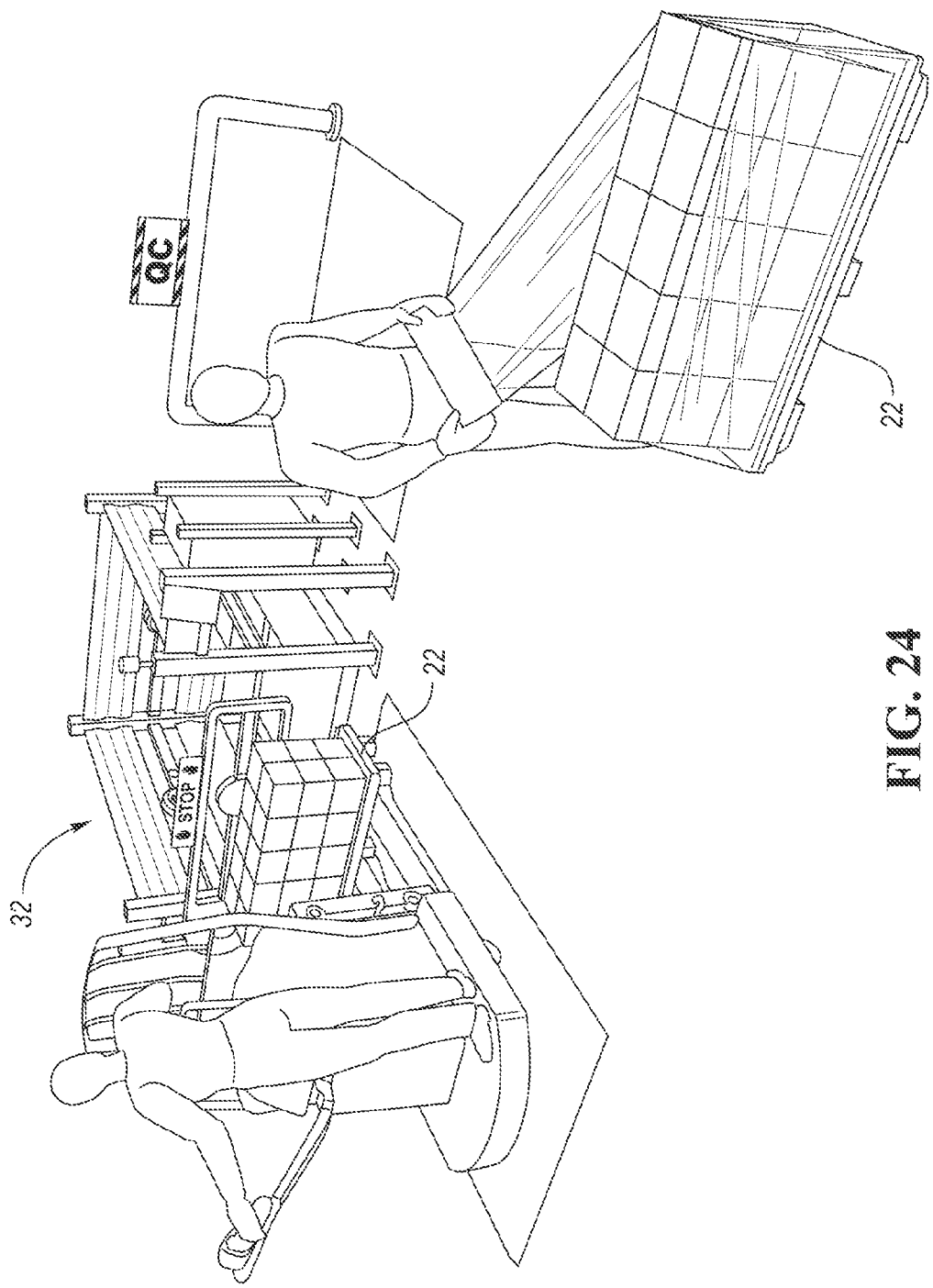
FIG. 24 shows the loaded pallet being manually wrapped after validation or correction.

After the pallet 22 is validated (or corrected at QC station 33), the pallet 22 can be wrapped with a robo wrapper 66 (FIG. 23) or manually (FIG. 24).

Figure 25:
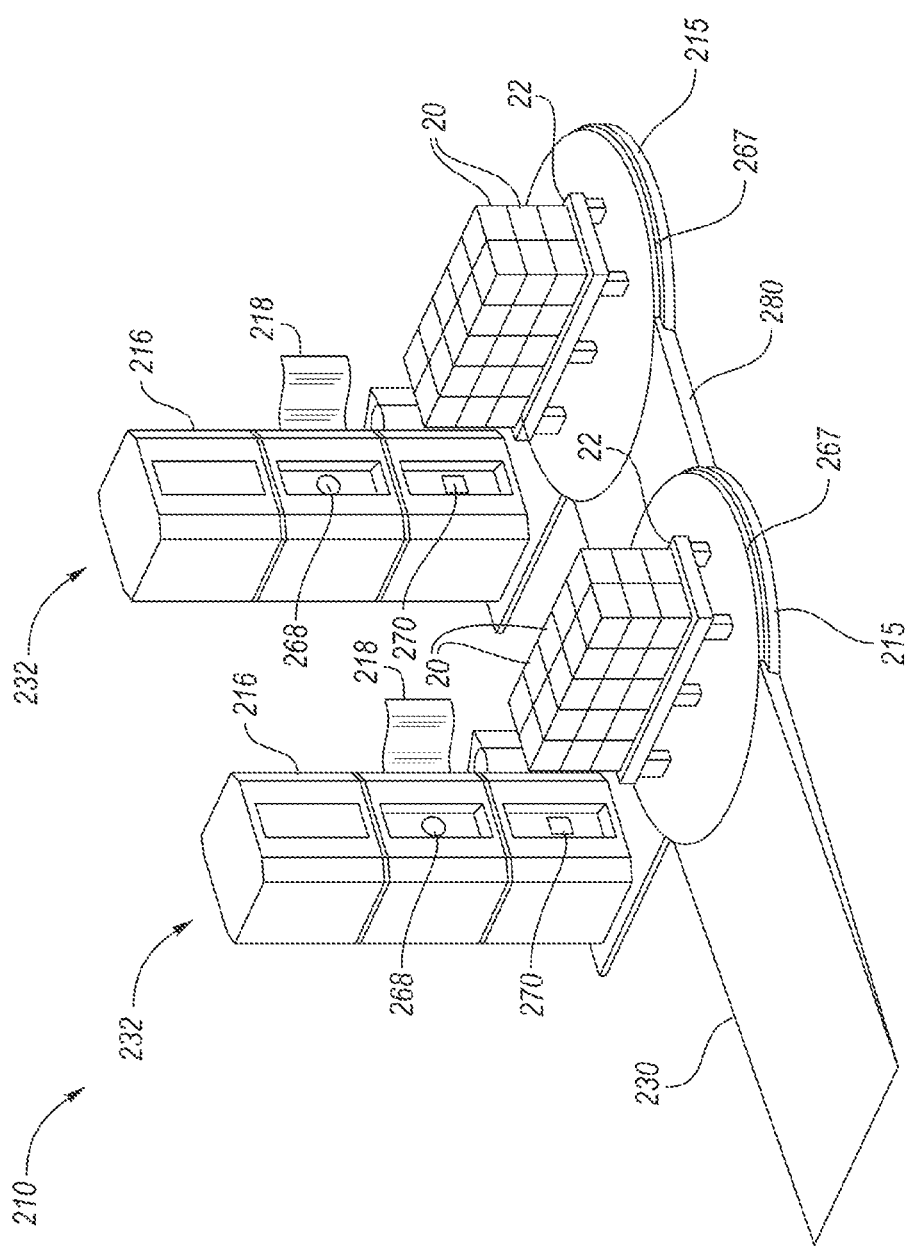
FIG. 25 shows a tandem validation/wrapping station according to another embodiment.

A tandem turntable system 210 is shown in FIG. 25 including first and second wrapping/validation stations 232 that could be used in the system 10 of FIG. 1. Each station 232 may perform wrapping and/or verification of a pallet 22 loaded with items 20. Each station 232 includes a turntable 267 on which the loaded pallet 22 can be placed for wrapping and/or verification.

Each station 232 further includes an associated tower structure 216 adjacent the turntable 267. Again, the tower structure 216 may provide the wrapping function in which it dispenses stretch wrap 218 about the products on the half pallet 22 as the half pallet 22 is rotated by the turntable 267. The tower structure 216 may alternatively provide the validation function via at least one camera 268 where it images the loaded half-pallet (and the items thereon) as it is rotated by the turntable 267. Optionally, each tower structure 216 provides both functions. An RFID reader 270 may be mounted near (or on) the tower structure 216 for reading an RFID tag on the half-pallet 22 on the associated turntable 267. Each tower structure 216 has an associated computer receiving images from the at least one camera 268 and receiving signals from the RFID reader 270. The computer also controls the turntable 267.

In FIG. 25, there is a ramp 230 leading to the first turntable 267 and a bridge 280 between the first turntable 267 and the second turntable 267. The bridge 280 provides a support surface substantially flush with upper surfaces of the first turntable 267 and the second turntable 267. Each turntable 267 may also include a weight sensor 215 that weighs the loaded pallet 22 on the turntable 267 for validation.

Figure 26:
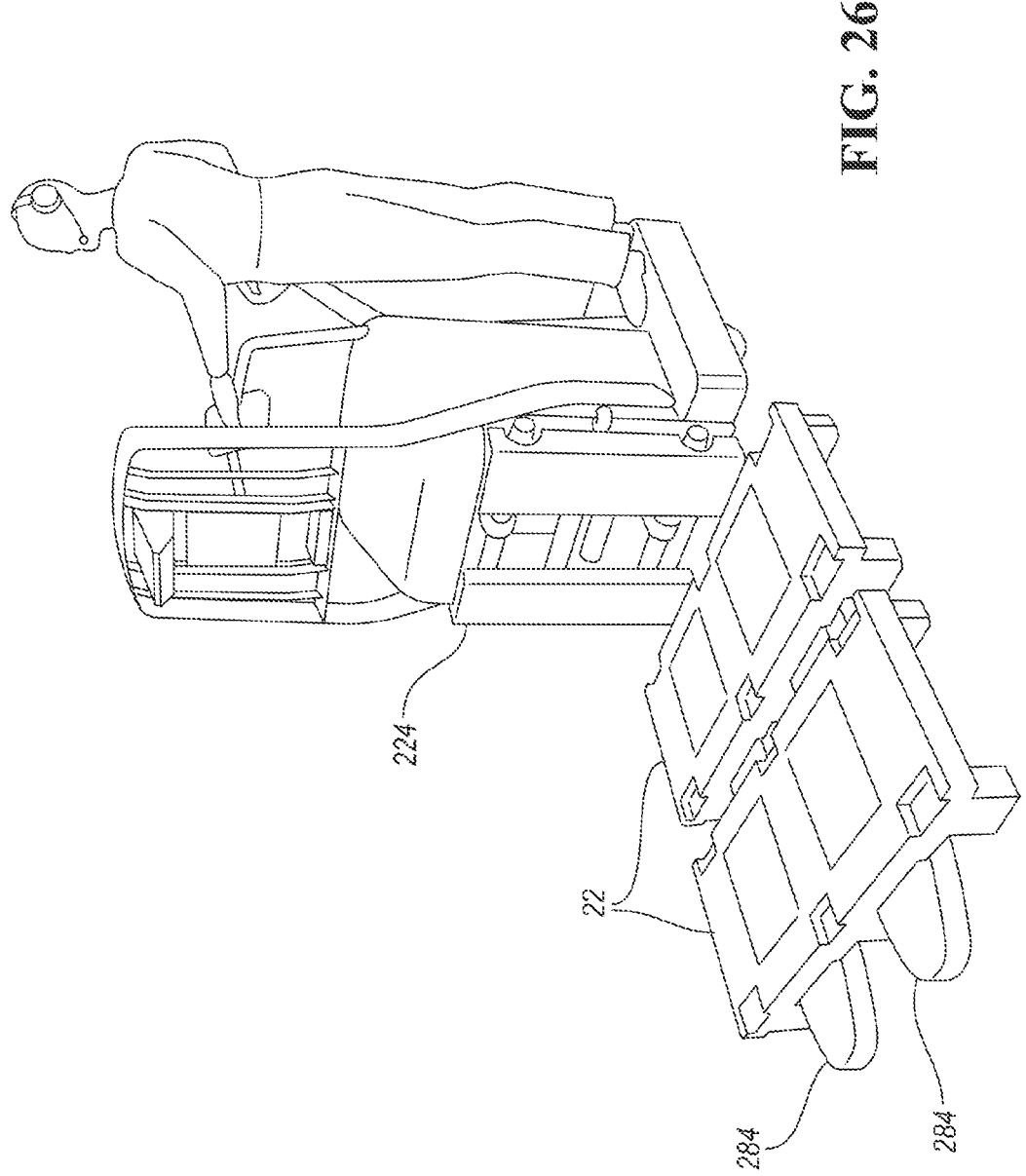
FIG. 26 shows two half-pallets supported on a walkie-rider to be carried to the station of FIG. 25.

Referring to FIG. 26, a walkie-rider 224 carries two half-pallets 22 (shown empty but they would be loaded) on its tines 284, one half-pallet 22 in front of the other. Alternatively, a pallet lift, pallet sled, or pallet jack could be used.

Referring to FIGS. 25 and 26, the user can drive the walkie-rider 224 up the ramp 230, across the first turntable 267, across (or onto) the bridge 280 and leave the outer loaded half-pallet 22 on the second turntable 267. Then the user can reverse the walkie-rider 224 until it is in a position to leave the inner loaded half-pallet 22 on the first turntable 267. Then the walkie-rider 224 is further reversed down the ramp 230 out of the way. Both wrapping/validation stations 232 can be started after the inner half-pallet 22 is placed on the first turntable 267. Alternatively, the second wrapping/validation station 232 can be started as soon as the walkie-rider 224 reverses away from the second turntable 267, and the first wrapping/validation station 232 can be started subsequently, as soon as the walkie-rider 224 reverses away from the first turntable 267. This alternative may be advantageous if the outer loaded pallet 22 on the second turntable 267 is larger and takes longer to wrap and/or might take longer to validate. The stations 232 may be initiated automatically by the computer associated with each station 232 upon detection that the walkie-rider 224 has moved off the associated turntable 267, e.g. via the camera 268. Alternatively, the computer could detect the placement of the loaded pallet 22 via the weight sensor 215 and then wait a predetermined period of time or wait until the camera detects that the walkie-rider 224 has moved away before initiating the validation and/or wrapping sequence. Alternatively, the user can initiate validation and/or wrapping via a signal from a tablet on the walkie-rider 224 or buttons on the stations 232.

When both loaded pallets 22 are wrapped and/or completed validation, the turntables 267 ensure that the pallets 22 are oriented perpendicularly to the ramp 230. For example, the computer onboard (or adjacent) each tower 216 may use the camera 268 to verify the orientation of the pallet 22 and power the turntable 267 so that the pallet 22 is perpendicular to the ramp for easy picking by the walkie-rider 224. Alternatively, the computer onboard each tower 216 may ensure that the associated turntable 267 returns to its initial rotational position. The walkie-rider 224 is driven up the ramp 230 to lift the inner loaded pallet 22, then driven across the first turntable 267, then onto (or across) the bridge 280 to lift the outer loaded pallet 22. The walkie-rider 224 then reverses from the bridge 280, across the first turntable 267, then down the ramp 230 and moves the loaded, wrapped/validated half-pallets 22 to the next station (QA or loading).

Figure 27:
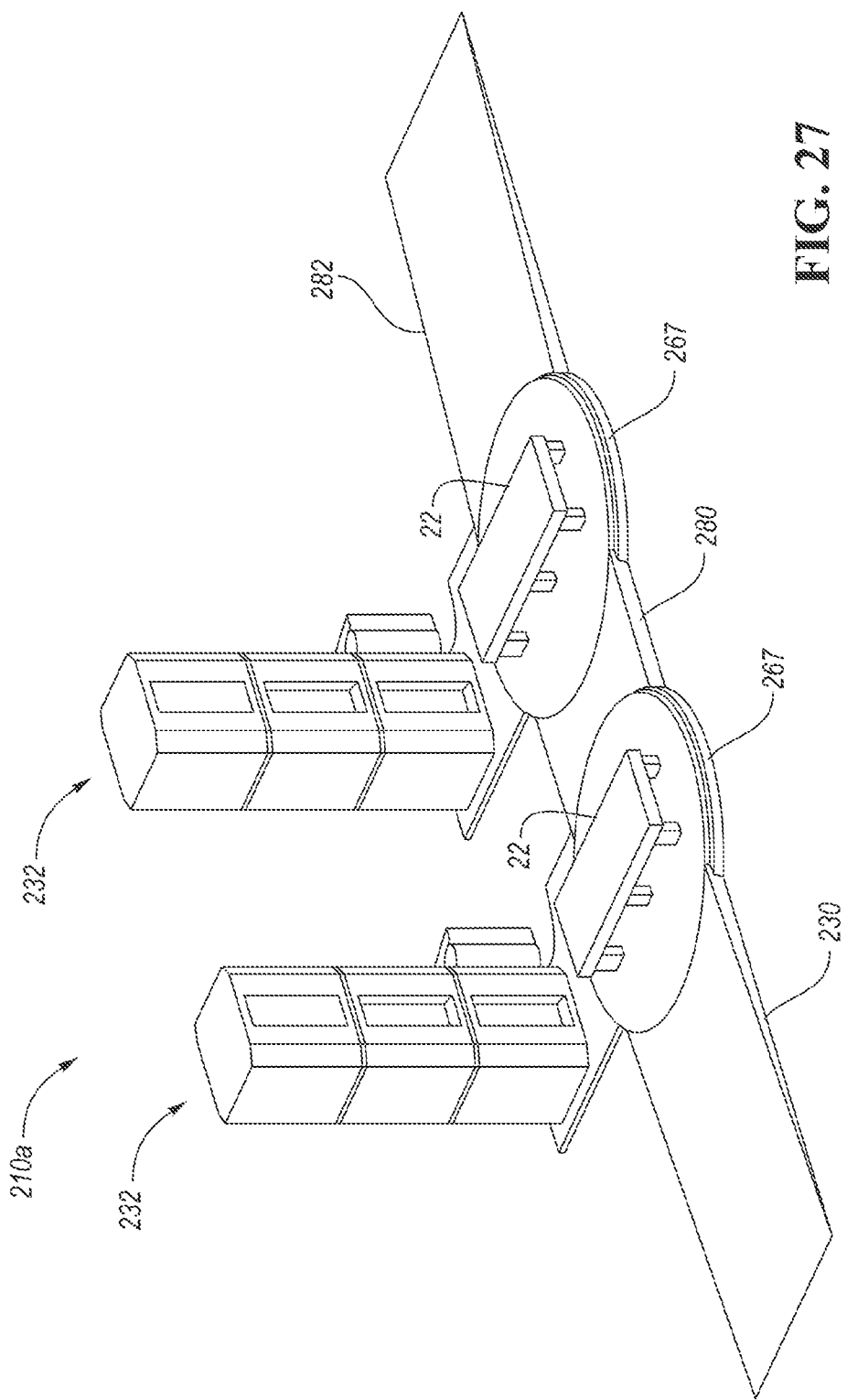
FIG. 27 shows an alternate validation/wrapping station.

FIG. 27 shows an alternate system 210a, which is identical to the system 210 of FIG. 26, but also includes a ramp 282 adjacent from the second turntable 267. The user can drive the walkie-rider 224 up the ramp 230, across the first turntable 267, across (or onto) the bridge 280 and leave the outer loaded half-pallet 22 on the second turntable 267. Then the user can reverse the walkie-rider 224 until it is in a position to leave the inner loaded half-pallet 22 on the first turntable 267. Then the walkie-rider 224 is further reversed down the ramp 230 out of the way. When both loaded pallets 22 are wrapped and/or completed validation, the walkie-rider 224 is driven up the ramp 230 to lift the inner loaded pallet 22, then across the first turntable 267, then onto (or across) the bridge 280 to lift the outer loaded pallet 22. The walkie-rider 224 then continues across the second turntable 267, down the ramp 282 and moves the loaded, wrapped/validated half-pallets 22 to the next station (QA or loading).

Additionally, both turntables 267 are always independently accessible via one of the ramps 230, 282. For example, full-size pallets could be carried up each of the ramps 230, 282 by different walkie-riders 224 such that the two stations 232 could be used independently.

In either system 210 or 210a, the tandem turntables 267 could have a notification system which communicates to operators which turntable may be fastest or readily available upon arrival in order to reduce wait times when all turntables are in use.

Optionally, the tandem turntables could have a large LCD screen showing wait times per turntable station. In another embodiment the operator may be able to receive this information from a device carried with the operator or located on the operator's equipment.

The tandem turntables 267 could be controlled by a single interface which could be within reach of the operator while the operator remains on a piece of equipment. This could increase throughput by saving time typically spent dismounting a piece of equipment and walking over to the interface.

Optionally, the operator may be able to control the turntables from a device that is carried by the operator or that is located on the operator's equipment, such as a tablet.

The bridge 280 is useful in installations as shown above where the turntables 267 are placed on the floor and therefore have upper support surfaces that are elevated relative to the surrounding floor. However, as another alternative, the turntables 267 may be used in tandem by installing them flush with the warehouse floor. This may be done to reduce the required space needed to install and use tandem turntables 267. In this embodiment there is no need for a bridge or entrance/exit ramps and the pallets 22 may be accessed from any angle.

The turntables 267, ramps 230, 234 and bridges 280 could be modular so that they may be separated and used independently from each other, or added together in configurations to suit the number of pallets 22 that are on a lift (e.g. one, two or more than two).

Certain times of the year a warehouse may require higher full-size single pallet throughput and it may be advantageous to use the turntables independently, but other times of the year the need for higher throughput of half-pallets may exist and it may be advantageous to use the turntables in tandem.

The tandem turntables 267 could also be used with two full size pallets if the material handling equipment tines are lengthened to suit.

The turntable 267 design may have specialized design changes to allow the turntable 267 to withstand being driven over with common material handling equipment used in a warehouse, such as a forklift, electric pallet truck, electric walkie rider and others.

In one optional embodiment the turntable 267 may use a hard stop to prevent the turntable 267 from deflecting past a certain point as the turntable 267 is driven over. This could be done to protect load cells used on the turntable 267 or the mechanics which rotate the table 267.

In another embodiment the turntable 267 could use damping features to reduce the impact force caused by a piece of material handling equipment driving over the turntable.

Figure 28:
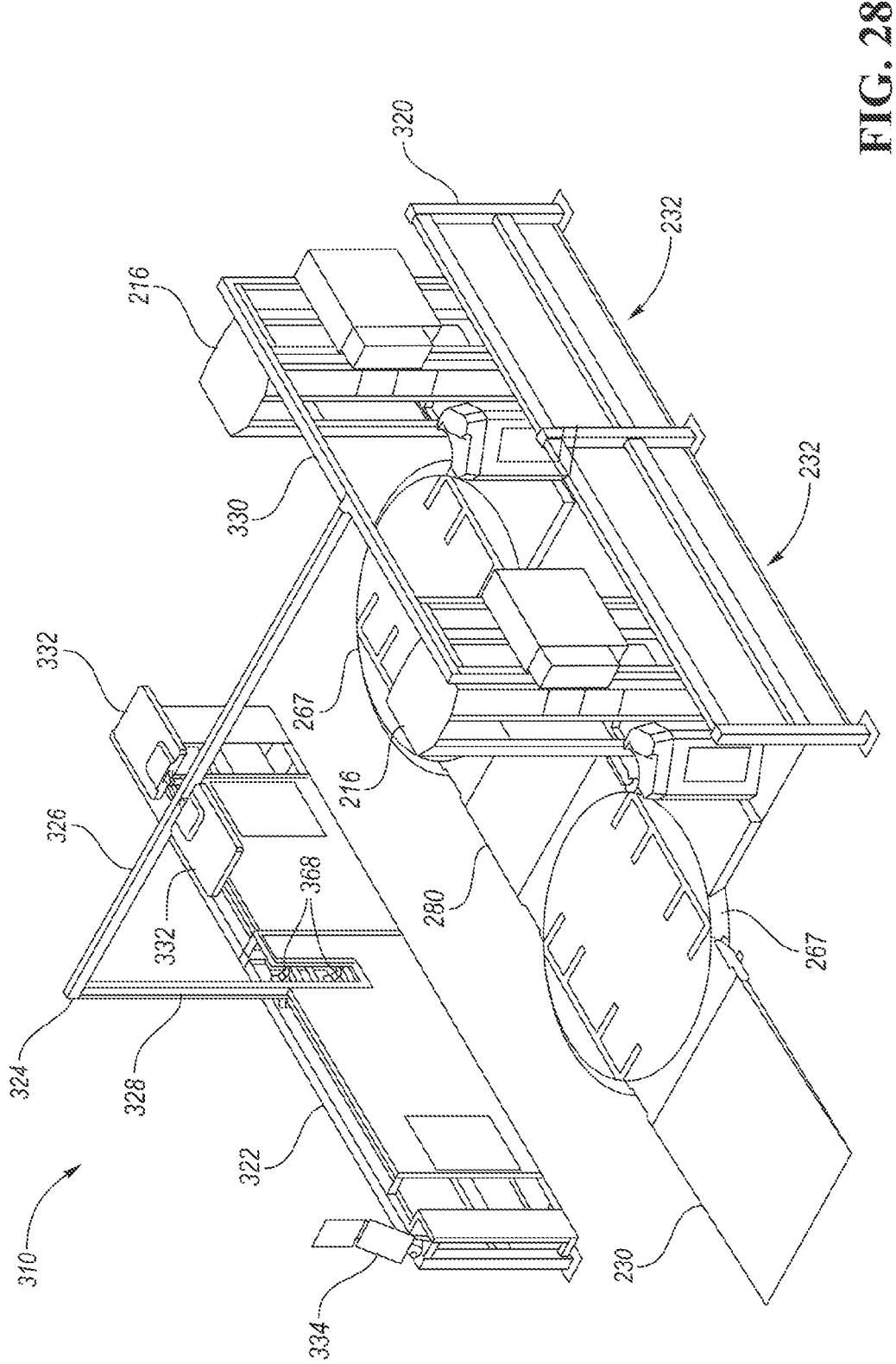
FIG. 28 shows a modular turntable system according to another embodiment.

FIG. 28 shows a modular turntable system 310 according to another embodiment, which includes the stations 232 of FIG. 25. The modular turntable system 310 could be used in the delivery system 10 of FIG. 1. Again, each station 232 includes the tower structure 216 and an associated turntable 267. The ramp 230 leads to a first turntable 267. The bridge 280 connects the turntables 267. The second ramp 282 may also be used but is not shown.

In this embodiment, a first fence 320 is positioned outward of the tower structures 216. A second fence 322 is positioned adjacent the turntables 267 such that the turntables 267 and tower structures 216 are between the first fence 320 and the second fence 322. The fences 320, 322 provide protection to the turntables 267 from accidental impacts. The fences 320, 322 are made from RF-attenuating material to shield the RFID readers 270 (e.g. on tower structures 216—not visible in FIG. 28 but shown in FIG. 25) within the fences 320, 322 from any RFIDs outside the fences 320, 322.

An overhead gantry 324 includes a vertical portion 328 extending upward from the second fence 320. A horizontal portion 326 extends from an upper end of the vertical portion 328 over the turntables 267, preferably centered between the turntables 267 to a cross-bar 330 mounted to the tower structures 216. Overhead lights 332 are mounted to the horizontal portion 326. A plurality of cameras 368 (preferably four, although only two are visible in FIG. 28) are mounted to the vertical portion 328 of the overhead gantry 324. Alternatively, the cameras 368 could be mounted to the second fence 322.

The overhead gantry 324 is physically decoupled from the rest of the system 310 to prevent inadvertent camera vibrations. In this embodiment the overhead gantry 324 is attached directly to the floor. Alternatively, the overhead gantry 324 could be attached to the ceiling.

In this embodiment the gantry 324 has a vertical portion 328 with a horizontal portion 326. In other embodiments the gantry 324 uses a single vertical member, multiple vertical members or a vertical member with a cantilevered horizontal member.

Power and signal wiring is run through and protected by the overhead gantry 324. This prevents tripping hazards and damage to cables on the ground.

Figure 29:
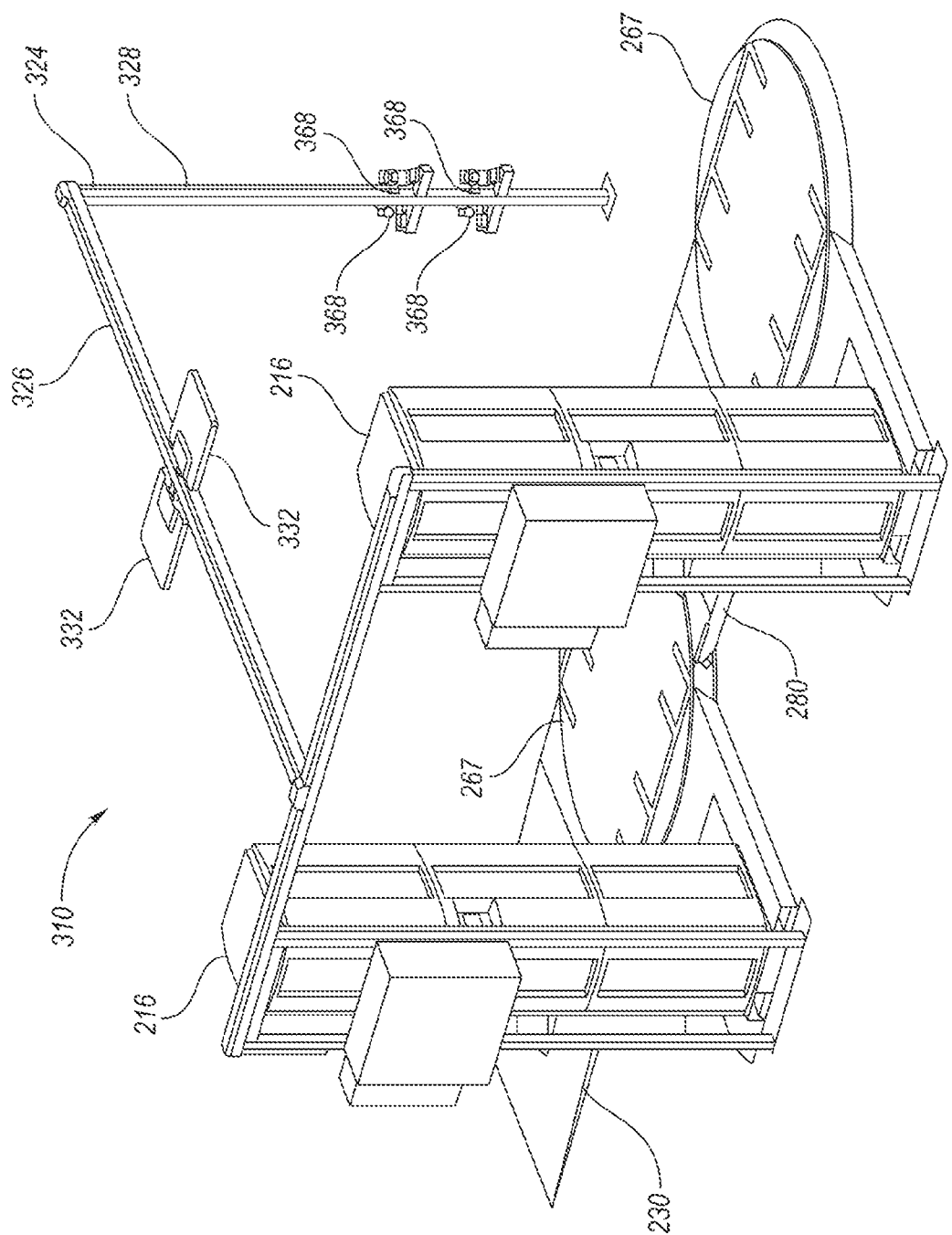
FIG. 29 shows the modular turntable system of FIG. 28 with the fences removed for illustration.

FIG. 29 shows the system 310 without the fences 320, 322 for illustration. As shown, the cameras 368 are mounted in a single location that allows view of both turntables 267 in a tandem location. The views of the cameras 368 may be crossed such that the cameras 268 on the right are directed toward the turntable 267 on the left and vice-versa. In this embodiment the cameras 368 are located at the intersection between two circles circumscribed about the axis of the turntables 267. In this embodiment the radius of the circle is equal to the mid range of the lens depth of field of the cameras 368.

In another embodiment the cameras 368 could be positioned at various points on the overhead gantry 324, tower structure 216, and/or fences 320, 322. They could also be mounted to the floor, walls or ceiling.

This strategic positioning of the cameras minimizes the rotations needed to capture all required images and capturing all required images quickly improves the throughput capability.

The cameras 368 must be positioned at the correct distance, or the lens will not be able to focus. In this embodiment the camera position is installed on permanent apparatus referenced off the turntable 267. The value is ease and speed of installation. This also allows for an easily repeatable position of the camera 368.

In another embodiment the permanent apparatus is attached directly to the turntable 267. In another embodiment a "jig" or template is used to locate the cameras 368. In another embodiment the floor is marked with a stencil or other means to mark the installation location of the cameras relative to the turntables 267. In another embodiment the cameras 368 are attached directly to the tower structure 216 (as in the previous embodiments).

Integrating the lights, impact protection, RFID attenuation, and HMI into one unit reduces the footprint of the system saving valuable warehouse space. The integration of the HMI allows the operator to control both turntables reducing the total number of steps and increasing throughput. The placement of the HMI could be within reach of the equipment operator while on the equipment so the turntables could be controlled without exiting the equipment.

The overhead gantry and integrated fence are designed such that all components are packable on a 48"×96" pallet. This allows for less expensive shipping and easier installation.

Operation of the system 310 is the same as that of FIG. 25. If the second ramp 282 is added, then operation of the system 310 can be the same as that of FIG. 27.

In this embodiment the overhead gantry is coupled and fastened together but in another embodiment it could be welded together on site or slip fit and pinned.

In another embodiment the overhead gantry and integrated fences uses a camera and light without a turntable or wrapper for use in identifying contents of a pallet.

The turntables, ramps, bridges, integrated fence, and overhead gantry could be modular so that they may be separated and used independently from each other or added together in configurations to suit the number of pallets that are on a lift.

Certain times of the year a warehouse may require higher full size single pallet throughput and it may be advantageous to use the turntables independently, but other times of the year the need for higher throughput of half-pallets may exist and it may be advantageous to use the turntables in tandem.

The tandem turntables could also be used with two full size pallets if the material handling equipment tines are lengthened to suit. The value of the modular design is the system can be configured to run a single pallet or configured to run two pallets (tandem) to match throughput needs.

The system 310 of FIG. 28 can be reconfigured into the system 310a of FIG. 30 with a single turntable 267. With only the addition of another overhead gantry 324 and cameras 368, the other turntable 267 and tower structure 216 could also be used independently. As shown, the first fence 320 of FIG. 28 is comprised of two first fence sections 320a (one shown in FIG. 30) and the second fence 322 of FIG. 28 is comprised of two second fence sections 322a (one shown in FIG. 30).

The turntables 67 and turntables 267 in the various embodiments above preferably are capable of withstanding being driven over by the walkie-rider 224 or other pallet lifts. A turntable 267 is shown in FIG. 31 with the table removed. The turntables 67 would be identical. The table support 290 is connected to a frame 293 via a plurality of load cells 292, in this example, three. The load cells 292 suspend the table support 290 and are used to measure the weight of the load upon the turntable. Generally, load cells 292 measure deflection (or strain) and compute weight. The challenge with driving over the turntable 267 is the weight of the equipment (eg. 3000 lb) and shock loads that the equipment generates during use can overload and damage the load cells 292. Oversized load cells could be used but measurement precision would be lost.

FIG. 32 is a partial section/schematic view through a portion of the turntable 267 of FIG. 31 adjacent one of the load cells 292. The load cell 292 is mounted between a brace 294 on the table support 290 and a brace 295 on the frame 293. The table support 290 deflects downward under load. In this embodiment, in order to prevent deflection past the rated load of the load cells 292 and maintain measurement precision, hard stops 296 are located at a specific height underneath the table support 290, and the displacement is limited so that overloading the load cells 292 is not possible, but the weight range for normal measuring (eg. 5-2000 lb) is preserved and functions reliably. The hard stops 296 may be mounted to the frame 293 as shown or may be mounted to the floor beneath the table support 290.

However the image(s) of the loaded pallet 22 are collected, the image(s) are then analyzed to determine the SKU of every item 20 on the pallet 22 in step 158 (FIG. 2). Any method may be used to identify the SKUs associated with every item on the pallet 22. A few examples are described herein. For example, the images and dimensions of all sides of every possible product, including multiple versions of each SKU, if applicable, are stored in the server 14. If multiple still images or video are collected, then the known dimensions of the pallet 22 and the items 20 are used to ensure that every item 20 is counted once and only once.

Each SKU has an associated package type and an associated brand. The package type is detected first and then the brand is classified to identify what SKU is associated with that product. The package type describes the packaging of the SKU. For example 16Z_CN_1_24 is a package type to describe 16 ounce cans with 24 grouped together in 1 case. A case represents the sellable unit that a store can purchase from the manufacturer. The brand is the flavor of the beverage and is marketed separately for each flavor. For example, Pepsi, Pepsi Wild Cherry and Mountain Dew are all "brands." Machine learning may be used to detect all the package faces on the four pallet faces.

The package type of each item 20 is identified by the machine learning model. Other packaging types include reusable beverage crate, corrugated tray with translucent plastic wrap, or fully enclosed cardboard or paperboard box.

After determining all of the package types and brands for each package on the pallet that information can be used to look up SKU most likely associated with each item 20.

After individual items 20 are identified on each of the four sides of the loaded pallet 22, based upon the known dimensions of the items 20 and pallet 22, duplicates are removed, i.e. it is determined which items are visible from more than one side and appear in more than one image. If some items are identified with less confidence from one side, but appear in another image where they are identified with more confidence, the identification with more confidence is used.

For example, if the pallet 22 is a half pallet, its dimensions would be approximately 40 to approximately 48 inches by approximately 20 to approximately 24 inches, including the metric 800 mm×600 mm Standard size beverage crates, beverage cartons, and wrapped corrugated trays would all be visible from at least one side, most would be visible from at least two sides, and some would be visible on three sides.

If the pallet 22 is a full-size pallet (e.g. approximately 48 inches by approximately 40 inches, or 800 mm by 1200 mm), most products would be visible from one or two sides, but there may be some products that are not visible from any of the sides. The dimensions and weight of the hidden products can be determined as a rough comparison against the pick list. Optionally, stored images (from the SKU files) of SKUs not matched with visible products can be displayed to the user, who could verify the presence of the hidden products manually.

The computer vision-generated SKU count for that specific pallet 22 is compared against the pick list 64 to ensure the pallet 22 is built correctly. This may be done prior to the loaded pallet 22 being wrapped thus preventing unwrapping of the pallet 22 to audit and correct. If the built pallet 22 does not match the pick list 64 (FIG. 2, step 162), the missing or wrong SKUs are indicated to the worker (step 164), e.g. via a display. Then the worker can correct the items 20 on the pallet 22 (step 166) and reinitiate the validation (i.e. initiate new images in step 156) or wrap the loaded pallet in step 168.

If the loaded pallet 22 is confirmed, positive feedback is given to the worker, who then continues wrapping the loaded pallet 22 (step 168). The worker then moves the validated loaded pallet 22 to the loading station 34 (step 170). After the loaded pallet 22 has been validated, it is moved to a loading station 34 (FIG. 1).

Referring to FIG. 1, the loaded truck 18 carries a hand truck or pallet sled 24, for moving the loaded pallets 22 off of the truck 18 and into the stores 16 (FIG. 2, step 172). The driver has a mobile device 50 which receives an optimized route from the distribution center computer 26 or central server 14. The driver follows the route to each of the plurality of stores 16 for which the truck 18 contains loaded pallets 22.

At each store 16 the driver's mobile device 50 indicates which of the loaded pallets 22 (based upon their pallet ids) are to be delivered to the store 16 (as verified by gps on the mobile device 50). The driver verifies the correct pallet(s) for that location with the mobile device 50 that checks the pallet id (rfid, barcode, etc). The driver moves the loaded pallet(s) 22 into the store 16 with the pallet sled 24.

In accordance with the provisions of the patent statutes and jurisprudence, exemplary configurations described above are considered to represent preferred embodiments of the inventions. However, it should be noted that the inventions can be practiced otherwise than as specifically illustrated and described without departing from its spirit or scope. Alphanumeric identifiers on method steps are solely for ease in reference in dependent claims and such identifiers by themselves do not signify a required sequence of performance, unless otherwise explicitly specified.

What is claimed is:

1. A turntable system comprising:
a first turntable capable of supporting a loaded pallet;
a second turntable capable of supporting a loaded pallet, the second turntable adjacent the first turntable;
a flat support surface between the first turntable and the second turntable, wherein the support surface is substantially flush with an upper surface of the first turntable and an upper surface of the second turntable, wherein upper surfaces of the first turntable, the second turntable and the support surface are elevated relative to a surrounding floor, wherein the first turntable and the support surface are capable of supporting a walkie-rider driven thereacross; and
a ramp leading up to the first turntable, wherein the ramp is an inclined surface leading up to the first turntable.

2. The system of claim 1 further including a first camera directed toward the first turntable and a second camera directed toward the second turntable.

3. The system of claim 1 further including a stretch wrapper dispenser adjacent the first turntable wherein the stretch wrapper dispenser is configured to dispense stretch wrap onto a loaded pallet while being supported and rotated on the first turntable.

4. The system of claim 1 further including an overhead gantry.

5. The system of claim 4 wherein the overhead gantry extends between the first turntable and the second turntable.

6. The system of claim 4 further including a first stretch wrapper dispenser adjacent the first turntable and a first camera directed toward the first turntable, wherein the first turntable is between the first stretch wrapper dispenser and the first camera, wherein the first stretch wrapper dispenser is configured to dispense stretch wrap onto a loaded pallet while being supported and rotated on the first turntable.

7. The turntable system of claim 1 wherein the first turntable includes a weight sensor and the first turntable includes a hard stop preventing damage to the weight sensor by limiting vertical displacement of a first support surface of the first turntable.

8. A turntable system comprising:
a first turntable capable of supporting a loaded pallet;
a second turntable capable of supporting a loaded pallet, the second turntable adjacent the first turntable;
a support surface between the first turntable and the second turntable, wherein the support surface is substantially flush with an upper surface of the first turntable and an upper surface of the second turntable;
a ramp leading up to the first turntable;
an overhead gantry extending between the first turntable and the second turntable; and
at least one light mounted to the overhead gantry.

9. A turntable system comprising:
a first turntable capable of supporting a loaded pallet;
a second turntable capable of supporting a loaded pallet, the second turntable adjacent the first turntable;
a support surface between the first turntable and the second turntable, wherein the support surface is substantially flush with an upper surface of the first turntable and an upper surface of the second turntable;
a ramp leading up to the first turntable;
a first stretch wrapper dispenser adjacent the first turntable, wherein the first stretch wrapper dispenser is configured to dispense stretch wrap onto a loaded pallet while being supported and rotated on the first turntable;
a first camera directed toward the first turntable, wherein the first turntable is between the first stretch wrapper dispenser and the first camera; and
an overhead gantry including a horizontal portion extending between the first turntable and the second turntable and a vertical support supporting the horizontal portion, wherein the first camera is mounted to the vertical support.

10. The system of claim 9 further including a second stretch wrapper dispenser adjacent the second turntable and a second camera directed toward the second turntable, wherein the second turntable is between the second stretch wrapper dispenser and the second camera.

11. A turntable system comprising:
a turntable including a table support suspended on a frame;
a weight sensor configured to measure weight on the table support; and
a hard stop preventing damage to the weight sensor by limiting vertical movement of the table support relative to the frame, such that the turntable is capable of supporting a loaded walkie-rider thereon.

12. The turntable system of claim 11 further including:
a first inclined surface leading up to the turntable; and
a second inclined surface leading down from the turntable.

13. The turntable system of claim 12 further including at least one camera positioned adjacent the turntable.

14. The turntable system of claim 12 further including a stretch wrapper dispenser mounted adjacent the turntable.

15. The turntable system of claim 11 wherein the weight sensor is a load cell.

16. The turntable system of claim 11 wherein the weight sensor is a plurality of load cells suspending the table support on the frame and wherein the hard stop is configured to be contacted by the table support to prevent overloading the plurality of load cells.

17. The turntable system of claim 16 wherein the hard stop is mounted to the frame.

18. The turntable system of claim 17 wherein the hard stop is one of a plurality of hard stops each configured to be contacted by the table support to prevent overloading the plurality of load cells.

19. The turntable system of claim 18 further including at least one camera positioned adjacent the turntable.

20. The turntable system of claim 19 further including a stretch wrapper dispenser mounted adjacent the turntable.

21. A turntable system comprising:
a first turntable capable of supporting a loaded pallet;
a second turntable capable of supporting a loaded pallet, the second turntable adjacent the first turntable;
a support surface between the first turntable and the second turntable, wherein the support surface is substantially flush with an upper surface of the first turntable and an upper surface of the second turntable, wherein the support surface is capable of supporting a walkie-rider thereon; and
a ramp leading up to the first turntable.

* * * * *